(12) United States Patent
Berger et al.

(10) Patent No.: US 11,818,734 B2
(45) Date of Patent: Nov. 14, 2023

(54) METHODS AND APPARATUS FOR COMMUNICATING CYCLIC DELAY DIVERSITY INFORMATION AMONG PEER SIDELINK NODES

(71) Applicant: QUALCOMM Incorporated, San Diego, CA (US)

(72) Inventors: Peer Berger, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/212,893

(22) Filed: Mar. 25, 2021

(65) Prior Publication Data

US 2023/0134554 A1 May 4, 2023

Related U.S. Application Data

(60) Provisional application No. 63/004,038, filed on Apr. 2, 2020.

(51) Int. Cl.
*H04W 72/25* (2023.01)
*H04B 7/06* (2006.01)

(52) U.S. Cl.
CPC .......... *H04W 72/25* (2023.01); *H04B 7/0671* (2013.01)

(58) Field of Classification Search
CPC .............................. H04W 72/25; H04B 7/0671
See application file for complete search history.

(56) References Cited

U.S. PATENT DOCUMENTS

2019/0288760 A1* 9/2019 Li ............................ H04B 7/04
2020/0337021 A1* 10/2020 Zhang ....................... H04L 1/08
2020/0351827 A1* 11/2020 Chae .................... H04L 27/2607

* cited by examiner

*Primary Examiner* — Jae Y Lee
(74) *Attorney, Agent, or Firm* — Seyfarth Shaw, LLP

(57) ABSTRACT

Aspects directed towards receiving at a sidelink node from and communicating to peer sidelink nodes an indication on whether the CDD antenna diversity scheme is used in a data transmission are disclosed. Also disclosed is the receiving sidelink node optimizing its operation based on the knowledge of whether the CDD antenna diversity scheme is used in the data transmission and thus the performance at the receiving sidelink node is improved. Also disclosed are aspects directed to a peer sidelink node determining whether to use the CDD antenna diversity scheme based on a variety of factor and conveying the determination to the receiving sidelink node.

27 Claims, 16 Drawing Sheets

METHODS AND APPARATUS FOR COMMUNICATING CYCLIC DELAY DIVERSITY INFORMATION AMONG PEER SIDELINK NODES

CLAIM OF PRIORITY

The present Application for Patent claims priority to U.S. Provisional Patent Application No. 63/004,038, entitled "Methods and Apparatus for Communication Cyclic Delay Diversity Information Among Peer Sidelink Nodes," filed Apr. 2, 2020, which is expressly incorporated by reference herein.

FIELD OF TECHNOLOGY

The following relates generally to wireless communications and more specifically to communicating cyclic delay diversity (CDD) antenna diversity scheme information among peer side link nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, such as industrial internet of things (I-IoT) or vehicle to anything (V2X) applications, various UEs or sidelink nodes may be configured to communicate with each other over sidelink channels. Different antenna diversity schemes may be used for the sidelink communications. The cyclic delay diversity (CDD) antenna diversity scheme is one of possible antenna diversity schemes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In general, a receiving sidelink node does not have any acknowledge of what antenna diversity scheme is used for a received data transmission. Each of the different antenna diversity schemes has some advantages and disadvantages. Without of the knowledge of a specific antenna diversity scheme used in the data transmission, the receiving sidelink node or a UE may only assume one default antenna diversity scheme, which may not be optimal for the operations at the receiving sidelink node. As such, the receiving sidelink node fails to take advantages of some antenna diversity scheme such as cyclic delay diversity (CDD) antenna diversity scheme.

In an aspect of the disclosure, a method, a computer-readable medium, and an apparatus are provided. The apparatus is configured to receive an indication from one of a plurality of peer sidelink nodes indicating whether a cyclic delay diversity (CDD) antenna diversity scheme is used for a data transmission, the indication carried in an antenna diversity indication field of a sidelink control information (SCI). The apparatus is further configured to optimize at least one operation parameter based on the received indication that the CDD antenna diversity scheme is used in the data transmission received from the peer sidelink node.

In another aspect of the disclosure, a method, a computer-readable medium, and an apparatus are provided. The apparatus is configured to determining whether to use a cyclic delay diversity (CDD) antenna diversity scheme based on at least one operation parameter to achieve better performance. The apparatus is further configured to transmit an indication in a sidelink control information (SCI) in a broadcast sidelink control message indicating to a plurality of peer sidelink nodes whether to use the CDD antenna diversity scheme, the indication carried in an antenna diversity indication field of the sidelink control information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 3 and 6 show block diagrams of devices in accordance with aspects of the present disclosure.

DETAILED DESCRIPTION

In some wireless communications systems, such as industrial internet of things (Hot) applications and vehicle to everything (V2X) systems, various sidelink nodes or user equipments (UEs) may be configured to communicate with each other over sidelink channels. These sidelink communications may enhance the wireless systems via reduced latency, multi-path diversity, coverage extension, battery-life improvement, location enhancement, and infrastructure-less communication. There are different sidelink channels to convey different types of information between sidelink nodes. For example, there may be sidelink control channels such as PSCCH (physical sidelink control channel) for transmitting control data between the sidelink nodes. There may be sidelink data channels such as PSSCH (physical sidelink shared channel) for transmitting data between sidelink nodes.

Techniques are provided herein to communicating the information about the antenna diversity scheme between the sidelink nodes so that one sidelink nod may become aware of the antenna diversity scheme a transmitting sidelink node uses. Accordingly the receiving sidelink node may take advantage of the information and optimize its operation with regard to a received data transmission.

Particular aspects of the subject matter described herein may be implemented to realize one or more advantages. The described techniques may support improvements in the sidelink communication framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to wireless communications systems and a process flow diagram. Aspects of the disclosure are further illustrated by and described with reference to apparatus diagrams, system diagrams, and flowcharts that relate to determining a helper UE group.

Figure 1:
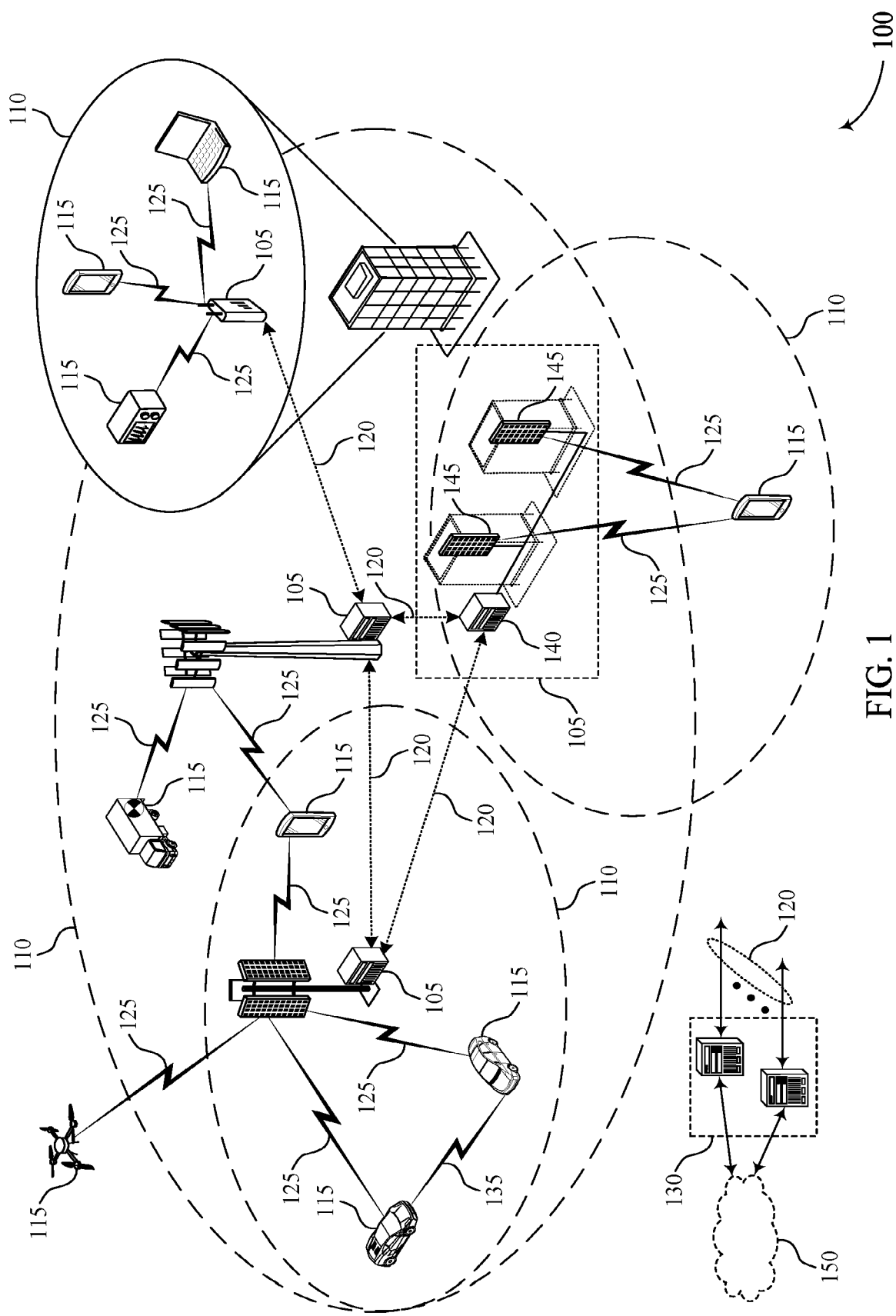
FIG. 1 illustrates an example of a system for wireless communications in accordance with aspects of the present disclosure.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 may be configured to communicate with each other over sidelink channels. These sidelink communications may enhance the wireless systems via reduced latency, multi-path diversity, coverage extension, battery-life improvement, location enhancement, and infrastructure-less communication. For example, a communication link may be established between a UE 115 and a base station 105. However, the link quality may be degraded due to fading or blockage. Another UE 115 may be utilized to help the affected UE 115 by communicating with the affected UE 115 using a sidelink channel. In some cases, the UEs 115 may perform various measurements to determine sidelink channel quality, channel throughput, and other metrics to determine whether to utilize a sidelink channel.

Another UE may be utilized to help the affected UE by communicating with the affected UE using a sidelink channel. In some cases, the UEs may perform various measurements to determine sidelink channel correlation and diversity and other information such as UE state information to help the associated base station 105 determine a helper UE group.

In some cases, the UE 115 may determine a sidelink channel correlation with at least one other UE 115 and report to the generic nodeB (gNB) 105 channel diversity information, UE state information, UE traffic pattern information, sidelink channel measurements, and the determined sidelink channel correlation; and receive an indication from the gNB 105 if the UE 115 is a member of a helping/helper UE group to facilitate communications with the affected UE. When a link between a base station fails or degrades due to fading, blocking, etc., then the base station may leverage the helper UE groups to communicate data to and receive data from an affected UE (e.g., target UE) using another UE (e.g., helping UE or helper UE) by leveraging a sidelink channel between the affected UE and the helper UE.

In some aspects, the base station 105 may receive sidelink channel correlation information from at least one UE; receive from each of the potential helper UEs 115 channel diversity information, UE state information, UE traffic pattern information, and sidelink channel measurements. The base station 105 may determine a helping/helper UE group based on the received sidelink channel correlation information, the received channel diversity information, the received UE state information, the received UE traffic pattern information, and the received sidelink measurements.

Techniques are provided herein to determine sidelink channel diversity based on various information received from each of the at least one UE 115. A base station may communicate an indication to each of the at least one UE whether the UE 115 is a member of the determined helper UE group and transmit data to one or more members of the helper UE group to be forward/retransmitted to the target UE.

Figure 2:
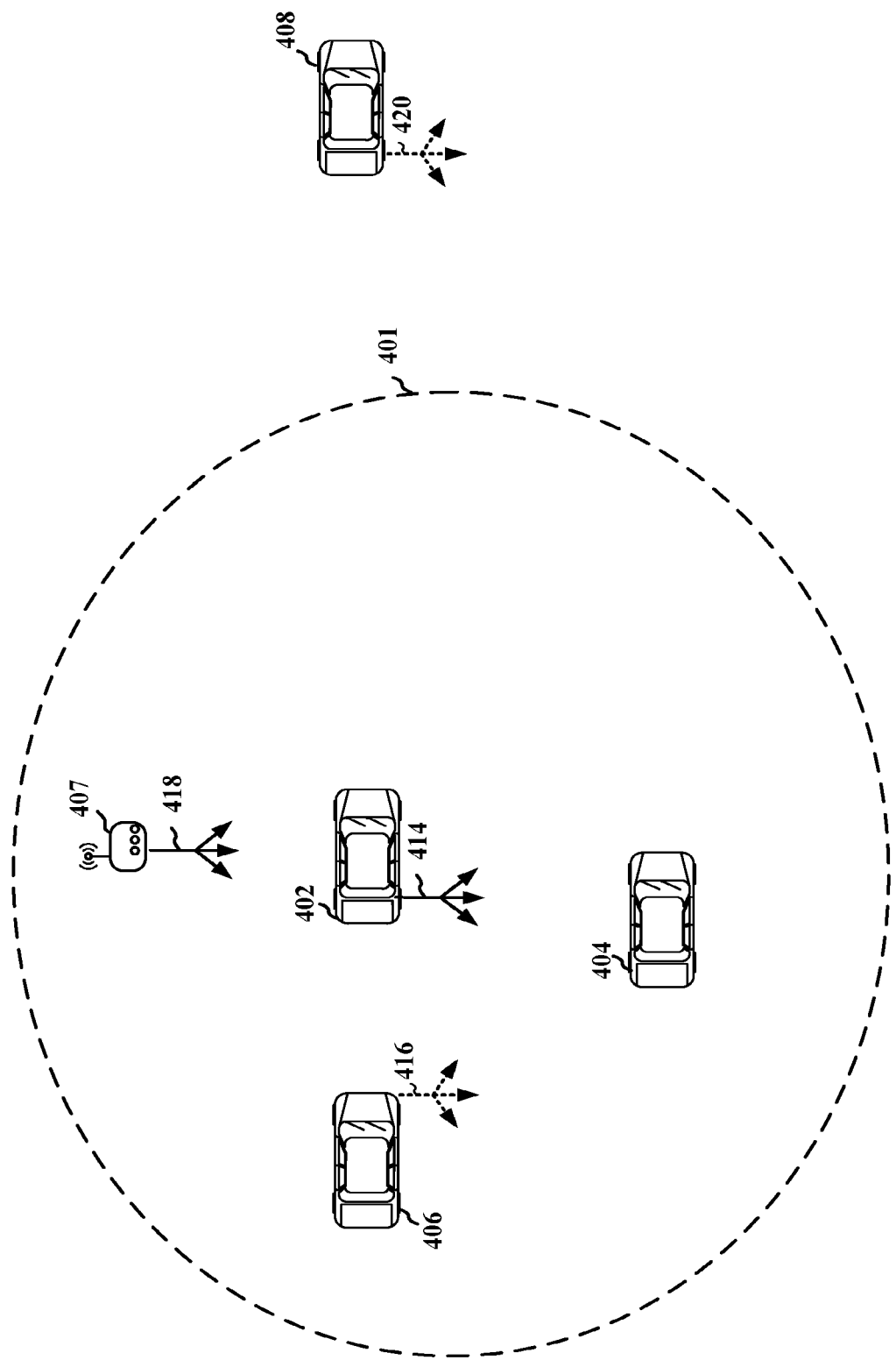
FIG. 2 illustrate examples of wireless communications systems in accordance with aspects of the present disclosure.

FIG. 2 illustrates an example 200 of wireless communication between devices based on V2X/V2V/D2D communication. The communication may be based on a slot structure comprising aspects described in connection with FIG. 1. For example, transmitting UE 202 may transmit a transmission 214, e.g., comprising a sidelink control channel and/or a corresponding sidelink data channel, that may be received by receiving UEs 204, 206, 208. A sidelink control channel may include information for decoding a data channel and may also be used by receiving device to avoid interference by refraining from transmitting on the occupied resources during a data transmission. The number of TTIs, as well as the resources that will be occupied by the data transmission, may be indicated in a control message from the transmitting sidelink nodes. The UEs 202, 204, 206, 208 may each be capable of operating as a transmitting device in addition to operating as a receiving device. Thus, UEs 206, 208 are illustrated as transmitting transmissions 216, 220. The transmissions 214, 216, 220 may be broadcast or multicast to nearby devices. For example, UE 202 may transmit communications intended for receipt by other UEs within a range 201 of UE 214. Additionally/alternatively, RSU 207 may receive communication from and/or transmit communication to UEs 202, 204, 206, 208.

Figure 3:
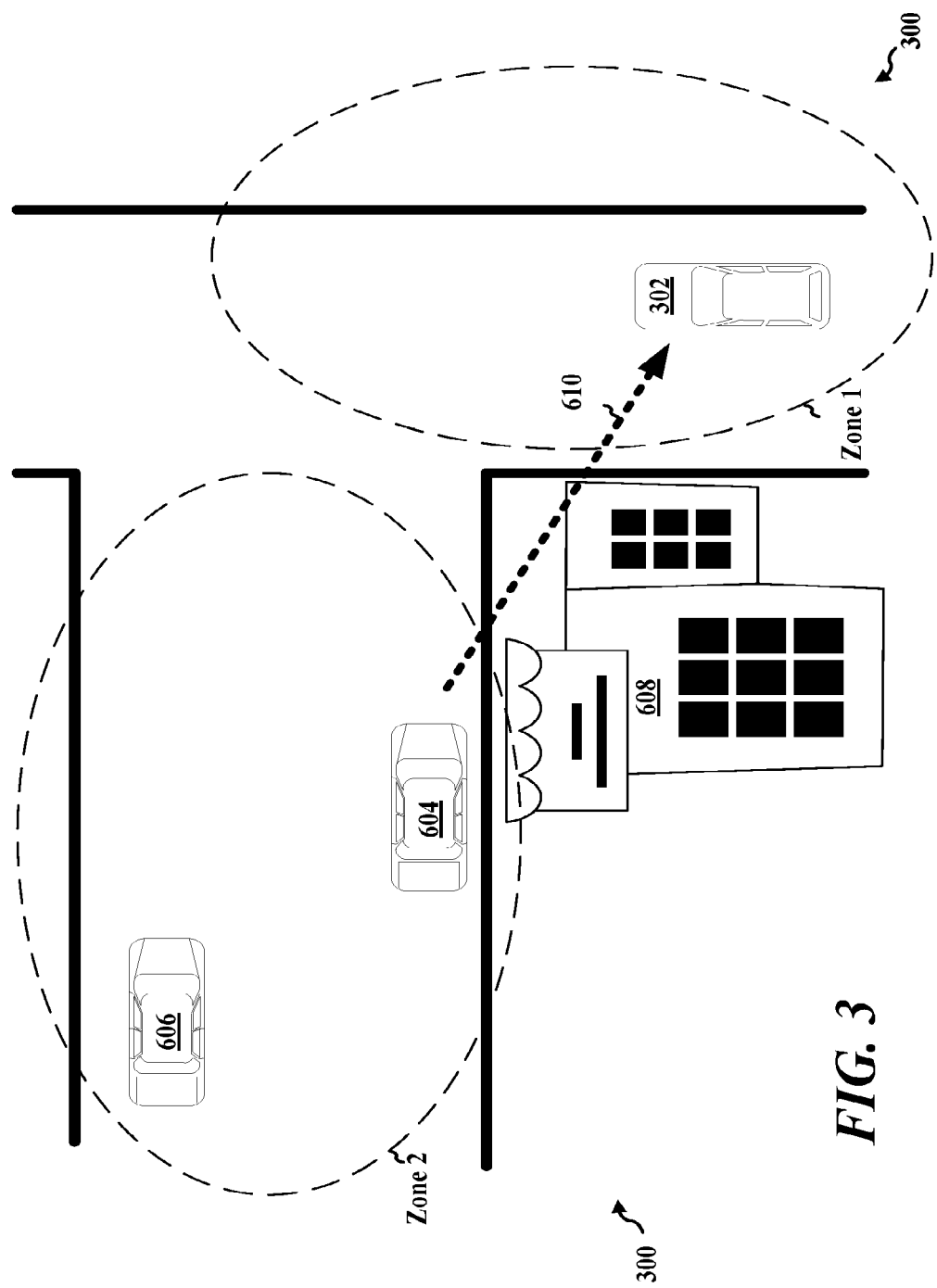
FIG. 3 illustrates an example of a wireless communications system in accordance with aspects of the present disclosure.

FIG. 3 illustrates an example of a V2X system 300 according to aspects of the present disclosure. As shown in FIG. 3, a transmitter UE 302 may be located in a first location (e.g., Zone 1) and other UEs 304, 306 may be in a second location (e.g., Zone 2). The transmitter UE 302 may receive sensing information from a receiving UE 304 via a sidelink transmission 310. The receiving UE 304 may indicate its location (e.g., Zone 2) to the transmitter UE 302 via second stage control information. Based on the location of the receiving UE 304, the transmitter UE 302 may determine whether a distance to the receiving UE 304 is greater than or less than a threshold.

When receiving sensing information via a sidelink transmission 310, the transmitter UE 302 may measure the received signal strength (e.g., RSRP) of the sidelink transmission. In the example of FIG. 3, a building 308 may interfere with the sidelink transmission 310. That is, the receiving UE 304 is in a non-line-of-sight (NLOS) condition. Therefore, although a distance between the transmitter UE 302 and the receiving UE 304 is less than a threshold, the received signal strength may be less than a threshold.

The distance and received signal strength may be indicative of a hidden node. That is, the transmitter UE 302 may discover a hidden node (e.g., receiving UE 304) when a distance to the node is less than a threshold and a received signal power of transmissions from the node is less than a threshold.

In one configuration, the transmitter UE 302 determines if a location of the UE 304 that transmitted the sensing information is within a pre-determined distance from the transmitter UE 302. If the location is within the pre-determined distance, the transmitter UE 302 may combine the sensing information if a received signal power (e.g., RSRP) of the transmission 310 including the sensing information is less than a threshold.

In one configuration, the transmitter UE identifies a set of UEs that transmitted sensing information on transmissions with a received signal power (e.g., RSRP) that is greater than a threshold. In this configuration, the UE combines the sensing information of a UE that is randomly selected from the set of UEs.

For example, the transmitter UE may receive sensing information from four out of five partner UEs. From the four partner UEs, the received signal power of two of the partner UEs may be greater than a threshold. In this configuration, the transmitter UE combines the received sensing information from a partner UE randomly selected from the two partner UEs corresponding to the received signal power that is greater than the threshold.

In V2X communications, quality of service (QoS) control or congestion handling may be relatively passive. For example, QoS control may be based on a measured channel busy ratio (CBR) or based on received V2X messages. Accordingly, when the transmitter UE selects resources for a transmission (e.g., sidelink transmission), the transmission may be associated with a QoS requirement. The transmitter UE may determine the CBR for a transmission. In this configuration, the UE combines the sensing information when the CBR is greater than a threshold.

FIGS. 2-3 illustrate one example operating environment for sidelink communications in a V2X situation. One antenna diversity scheme may be more suitable for one situation in the V2X environment than another antenna diversity scheme. The CDD antenna diversity scheme may be more suitable for some situations in the V2X environment than other antenna diversity schemes.

FIG. 2 illustrates an example of a process flow diagram 200 in accordance with aspects of the present disclosure. In some examples, process flow diagram 200 may implement aspects of wireless sidelink communications system 400. The process flow diagram 400 includes a sidelink node 402 and a peer sidelink node 404. The sidelink nodes 402 and 404 may be examples of the corresponding devices of FIG. 1, such as various UEs 115. The sidelink nodes 402 and 404 are examples of a plurality of peer sidelink nodes cable of sidelink communications.

Figure 15:
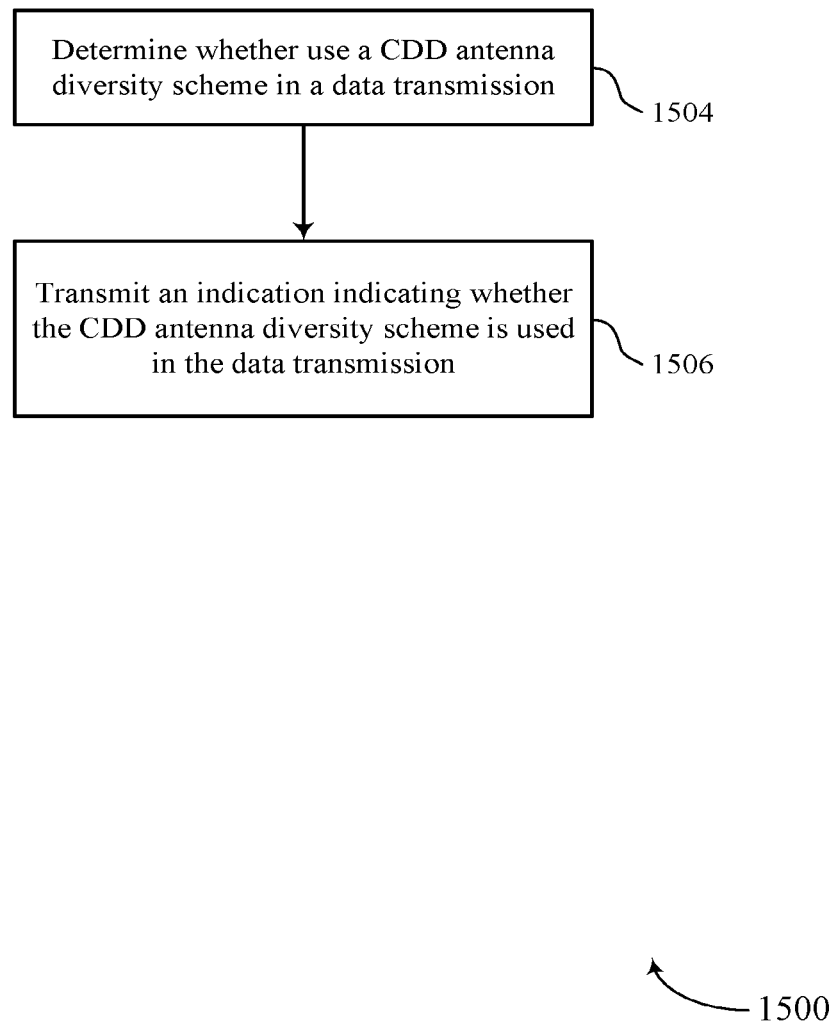
FIGS. 15 through 16 show flowcharts illustrating methods performed by a peer sidelink node or a like device in accordance with aspects of the present disclosure.
Figure 16:
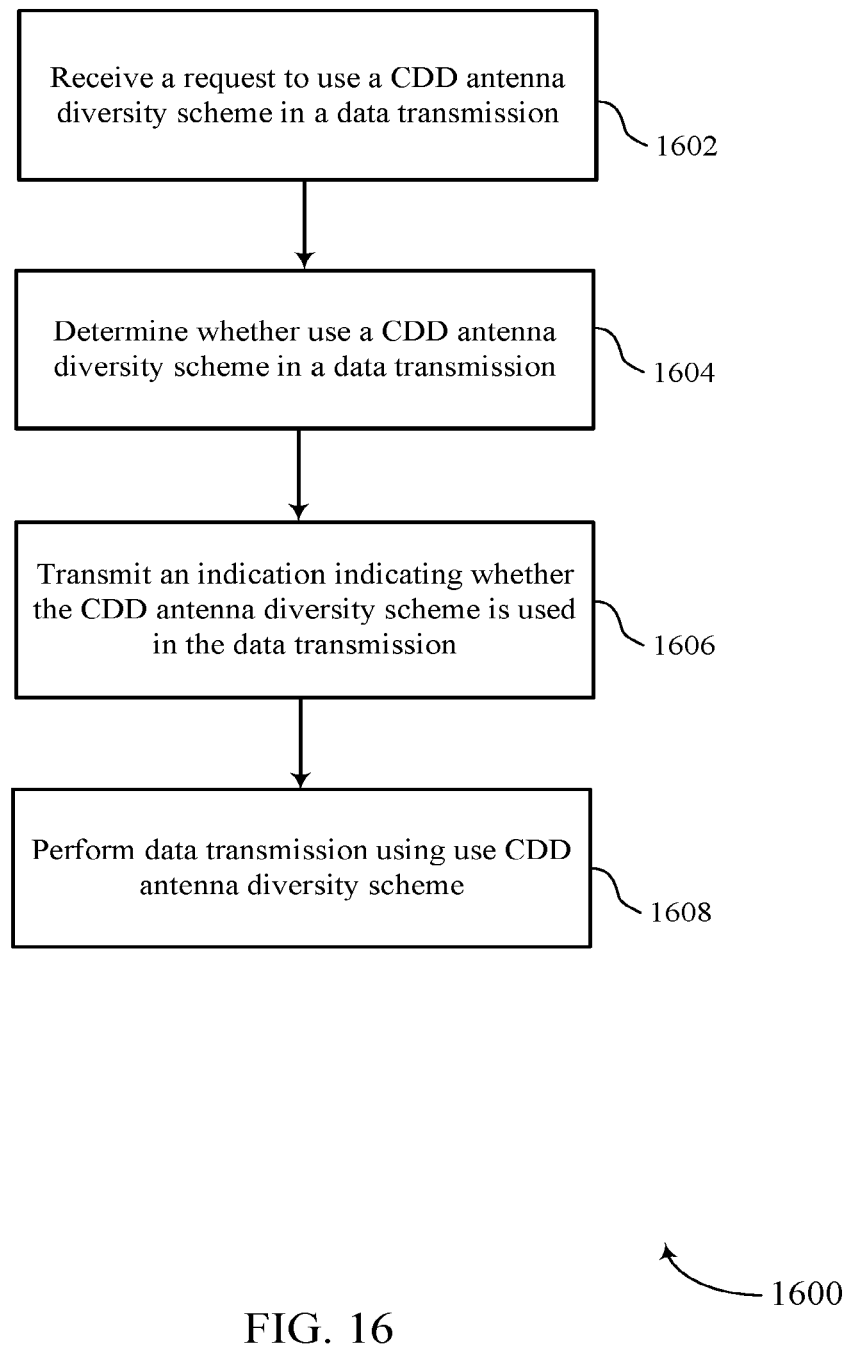

At 408, the peer sidelink node 404 determines whether it should use the CDD antenna diversity scheme in its data transmission for performance improvement. The decision on whether to use the CDD antenna diversity scheme may depend on a plurality of factors, as will be explained in more details in the corresponding sections for FIGS. 15 and 16.

In one example aspect, the CDD antenna diversity scheme is one type of transmit diversity mechanism implemented by applying a different phase delay (cyclic phase delay) for each wireless subcarrier, such as an OFDM subcarrier. In one example, it is used in spatial multiplexing to increase diversity between 2 spatial paths. Put in another way, in the CDD antenna diversity scheme, one antenna is transmitting the original copy of data and the other antenna is transmitting the cyclic shifted version of the original data.

In one example aspect, for an OFDM-based system, other antenna diversity scheme may also be used. For example, Alamouti space-frequency block code is also a often adopted transmission diversity schemes for 2-transmit antenna diversity systems. The CDD antenna diversity scheme may have advantages in some scenarios. For example, the CDD antenna diversity schema may have small delay in OFDM systems, in part because in one aspect it needs only one set of pilot signals, as opposed two sets of pilot signals required by some other antenna diversity schemes.

At 410, upon determining to use the CDD antenna diversity scheme, the peer sidelink node 404 may send an indication in a broadcast message to the sidelink node 402. The indication may be transmitted along with a data transmission itself or a separate sidelink control message. The indication is to notify all receiving sidelink nodes, including the sidelink node 402 that the received data transmission is transmitted with the CDD antenna diversity scheme.

At 412, the sidelink 402 receives an indication that the CDD antenna diversity scheme is used in the received data transmission. In one example aspect, the indication indicates that the received data transmission was transmitted using the CDD antenna diversity scheme. In addition, the indication may also indicate a type of CDD antenna diversity scheme such as a dynamic or static CDD and other information. For example, the indication may also indicate whether or not the subsequent data transmissions use the CDD antenna diversity scheme.

At 414, the sidelink node 402 optimizes its operation related to the data transmission based on the knowledge that the CDD antenna diversity scheme is used in the received data transmission. As will be described later, in one example aspect, optimizing operation may include optimizing some operation parameters. For example, optimizing one operational parameter may include adjusting a time offset or a frequency offset of a channel estimation at the receiving sidelink node.

At 416, the sidelink node 402 determines if it should request all peer sidelink nodes to use CDD antenna diversity scheme in their data transmissions. Whether or not to request peer sidelink nodes to use CDD antenna diversity scheme may depend on a plurality of factors, as will be described in more details later related to FIGS. 15-16. For example, in one example aspect, if the majority of the peer sidelink nodes do not have the capability of the CDD antenna diversity scheme (multiple antennas), the sidelink node 402 may not request that the sidelink nodes use the CDD antenna diversity scheme.

At 418, upon determining to request that the peer sidelink nodes use the CDD antenna diversity scheme, the sidelink node 402 sends out a request in a broadcast message that may reach all peer sidelink nodes within the transmission range of the node 402. The request merely indicates a preference by the sidelink node 402. The peer sidelink nodes such as the peer sidelink node 404 may or may not respect the request of the sidelink node 402, because as indicated above, each sidelink node determines if it uses the CDD antenna diversity scheme based on a set of factors of its own.

Figure 4:
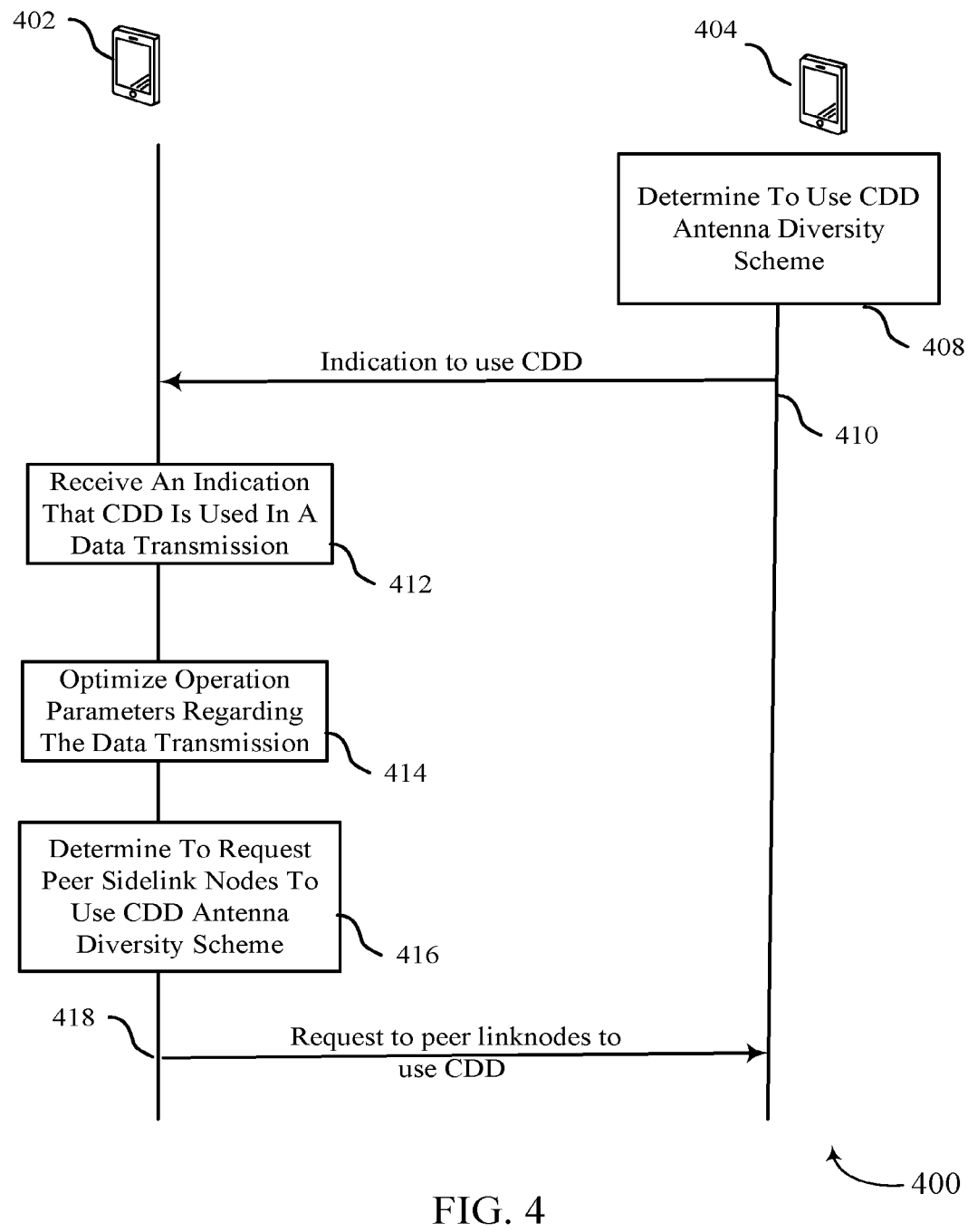
FIG. 4 illustrates an example of a process flow diagram in accordance with aspects of the present disclosure.

FIG. 4 illustrates as an example one possible process that embodies a sidelink node communicating the CDD antenna diversity information in a sidelink communication system. Different flow processes are possible with different, additional, or fewer steps. For example, the sidelink node 402 may send a request to the plurality of peer sidelink nodes to use the CDD antenna diversity scheme, prior to receiving an indication at 412. As another example, as an additional step, the sidelink node 402 may send out an indication that it uses the CDD antenna diversity scheme in a data transmission in addition to receiving an indication from the peer sidelink node 404 that the peer sidelink node 404 uses the CDD antenna diversity scheme for an associated data transmission.

FIG. 3 shows a block diagram 300 of a device 305 in accordance with aspects of the present disclosure. The device 305 may be an example of aspects of a UE 115 or sidelink nodes 402 and 404, as described herein. The device 305 may include a receiver 310, a communications manager 315, and a transmitter 320. The device 305 may also include a processor. Each of these components may be in communication with one another (e.g., via one or more buses).

The receiver 310 may receive information such as packets, user data, or control information associated with various information channels (e.g., sidelink control channels, data channels, and information related to transmit antenna diversity, etc.). Information may be passed on to other components of the device 305. The receiver 310 may be an example of aspects of the transceiver 620 described with reference to FIG. 6. The receiver 310 may utilize a single antenna or a set of antennas or multiple antenna panels.

The communications manager 315 may receive, from a peer sidelink node, a CDD antenna diversity indication that indicates whether the CDD antenna diversity scheme is used in an associated data transmission, among others and may transmit a request to peer sidelink nodes to use the CDD antenna diversity scheme. The communications manager 315 may be an example of aspects of the communications manager 610 described herein.

The communications manager 315, or its sub-components, may be implemented in hardware, code (e.g., software or firmware) executed by a processor, or any combination thereof. If implemented in code executed by a processor, the functions of the communications manager 315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 315, or its sub-components, may be physically located at various positions, including being distributed such that portions of functions are implemented at different physical locations by one or more physical components. In some examples, the communications manager 315, or its sub-components, may be a separate and distinct component in accordance with various aspects of the present disclosure. In some examples, the communications manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Based on implementing the sidelink measurement techniques as described herein, a processor of a UE 115 or sidelink nodes 402/404 (e.g., controlling the receiver 510, the transmitter 520, or the transceiver 820 as described with reference to FIG. 8) may increase performance in sidelink communication because the receiving sidelink node may take advantage of the knowledge that a received data transmission is transmitted with a CDD antenna diversity scheme.

FIG. 4 shows a block diagram 400 of a device 405 in accordance with aspects of the present disclosure. The device 405 may be an example of aspects of a device 305, or a UE 115 as described herein. The device 405 may include a receiver 410, a communications manager 415, and a transmitter 435. The device 405 may also include a processor. Each of these components may be in communication with one another (e.g., via one or more buses).

The receiver 410 may receive information such as packets, user data, or control information associated with various information channels (e.g., sidelink control channels, data channels, and information related to transmit antenna diversity, etc.). Information may be passed on to other components of the device 305. The receiver 310 may be an example of aspects of the transceiver 620 described with reference to FIG. 6. The receiver 310 may utilize a single antenna or a set of antennas or multiple antenna panels.

The communications manager 415 may be an example of aspects of the communications manager 315 as described herein. The communications manager 415 may include a CDD indication component 420, an operation optimization component 424, and a CDD request component 428. The communications manager 415 may be an example of aspects of the communications manager 610 described herein.

The CDD indication component 420 may determine the contents of a received CDD indication and if the CDD antenna diversity scheme is used for a data transmission, and then determine whether or not the sidelink node shall take any action based on the received CDD indication. The operation optimization component 424 may optimize some operation parameters with regard to the received data transmission based on the knowledge that the CDD antenna diversity scheme is used in the data transmission. The CDD request component 428 may determine whether the sidelink node shall request the peer sidelink nodes within the transmission range use the CDD antenna diversity and then broadcast the request.

The transmitter 435 may transmit signals generated by other components of the device 405. In some examples, the transmitter 435 may be collocated with a receiver 410 in a transceiver module. For example, the transmitter 435 may be an example of aspects of the transceiver 620 described with reference to FIG. 6. The transmitter 435 may utilize a single antenna or a set of antennas.

Figure 5:
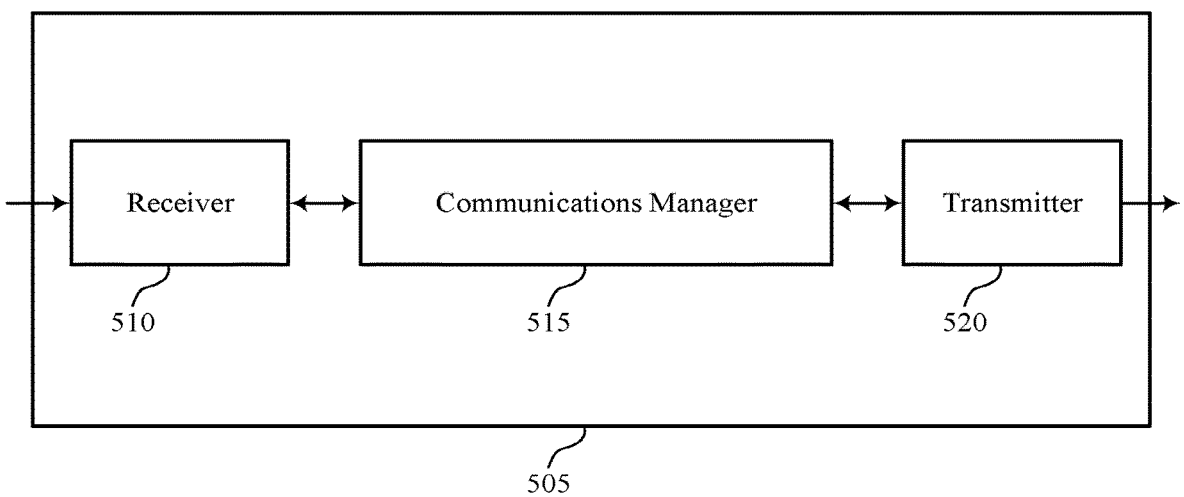

FIG. 5 shows a block diagram 500 of a communications manager 505 in accordance with aspects of the present disclosure. The communications manager 505 may be an example of aspects of a communications manager 315, a communications manager 415, or a communications manager 610 described herein. The communications manager 505 may include a CDD indication component 520, an operation optimization component 524, a communication interface 525, a CDD request component 528, a control component 535, and a RRC component 540. Each of these modules may communicate, directly or indirectly, with one another (e.g., via one or more buses).

The CDD indication component 520 may determine the contents of a received CDD indication and if the CDD antenna diversity scheme is used for a data transmission, and then determine whether or not the sidelink node shall take any action based on the received CDD indication. The operation optimization component 524 may optimize some operation parameters with regard to a received data transmission based on the knowledge that the CDD antenna diversity scheme is used in the data transmission. The CDD request component 728 may determine whether the sidelink node shall request the peer sidelink nodes within the transmission range use the CDD antenna diversity and then broadcast the request.

The communication interface 525 may receive a data transmission and a CDD antenna diversity indication from a sidelink node. In some examples, the communication interface 525 may receive a grant scheduling transmission of the data transmission via a sidelink channel, where the data transmission is transmitted to the sidelink node via the sidelink channel based on the grant.

The control component 535 may receive the control message including SCI with the CDD antenna diversity scheme indication. In some examples, the control component 535 may receive the control message that indicates whether the CDD antenna diversity indication is present in a CSI. In some examples, the control component 535 may receive the control message that indicates the resource allocation for data transmission on a sidelink channel.

Figure 6:
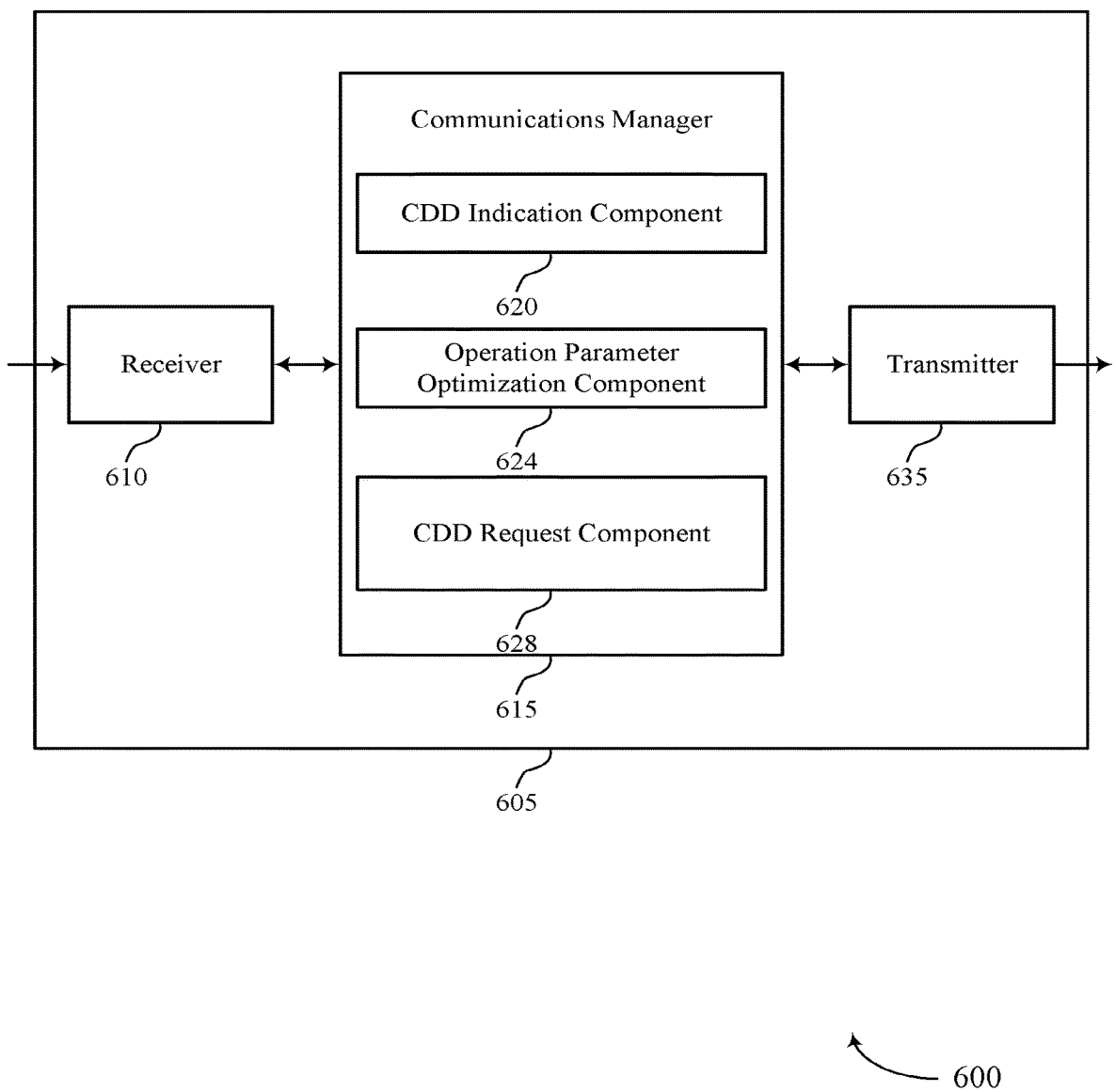

FIG. 6 shows a diagram of a system 600 including a device 605 in accordance with aspects of the present disclosure. The device 605 may be an example of or include the components of device 305, device 405, or a UE 115 as described herein. The device 605 may include components for bi-directional voice and data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The communications manager 610 may determine the contents of a received CDD indication and if the CDD antenna diversity scheme is used for a data transmission, and then determine whether or not the sidelink node shall take any action based on the received CDD indication. The communications manager 610 may optimize some operation parameters with regard to a received data transmission based on the knowledge that the CDD antenna diversity scheme is used in the data transmission. The communications manager 610 may also determine whether the sidelink node shall request the peer sidelink nodes within the transmission range use the CDD antenna diversity scheme and then broadcast the request.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include an antenna unit 625, which may include a single or multiple antennas. In case the antenna unit 825 has more than one antenna, the device may be capable of concurrently transmitting or receiving multiple wireless transmissions.

The memory 630 may include RAM and ROM. The memory 630 may store computer-readable, computer-executable code 635 including instructions that, when executed, cause the processor to perform various functions described herein. In some cases, the memory 630 may contain, among other things, a basic input/output system (BIOS) which may control basic hardware or software operation such as the interaction with peripheral components or devices.

The processor 640 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting determining UE sidelink diversity information and UE state information to facilitate communications with another UE via a sidelink channel).

The code 635 may include instructions to implement aspects of the present disclosure, including instructions to support wireless communications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
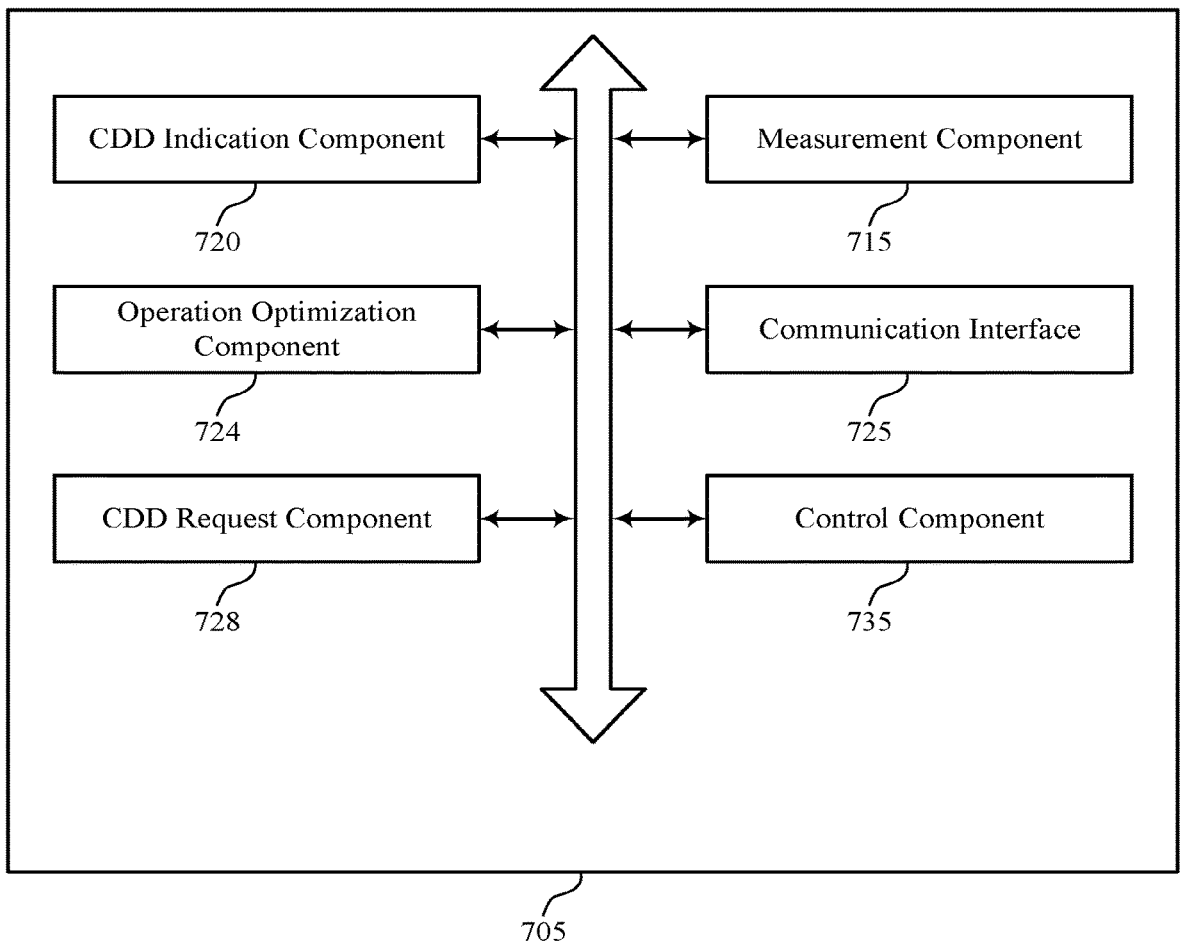
FIG. 7 shows a block diagram of a communications manager in accordance with aspects of the present disclosure.

FIG. 7 shows a block diagram 700 of a device 705 in accordance with aspects of the present disclosure. The device 705 may be an example of aspects of a sidelink node 402/404 or UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to sounding reference signal channel measurement for sidelink communication, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit, to a peer sidelink node, a CDD antenna diversity indication that indicates whether the CDD antenna diversity scheme is used in an associated data transmission, among others and may receive a request from a peer sidelink node to use the CDD antenna diversity scheme.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
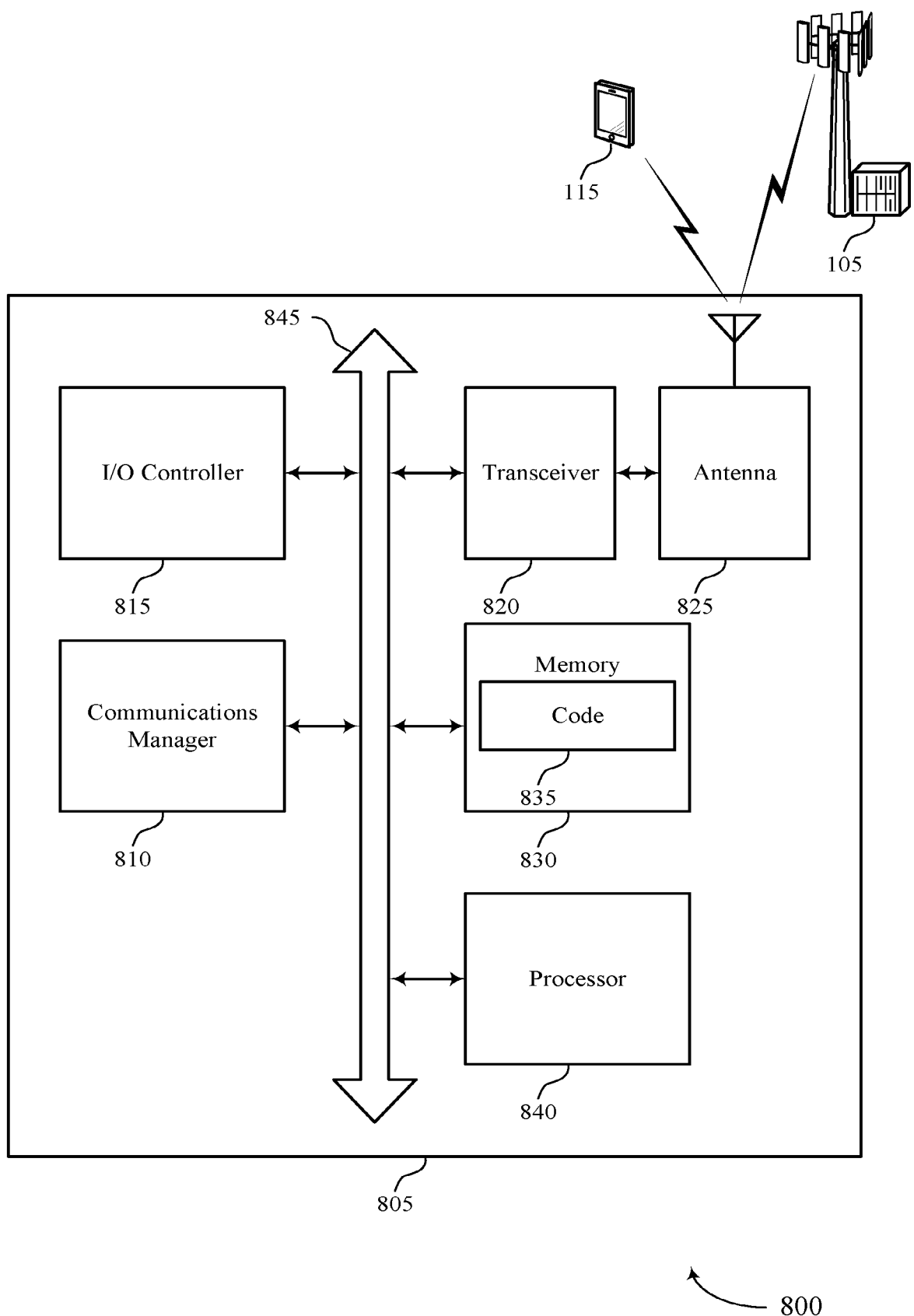
FIG. 8 shows a diagram of a system including a device in accordance with aspects of the present disclosure.

FIG. 8 shows a block diagram 800 of a device 805 in accordance with aspects of the present disclosure. The device 805 may be an example of aspects of a device 705, or a peer sidelink node 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to sounding reference signal channel measurement for sidelink communication, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a CDD request component 822, a CDD determination component 824, and a CDD indication component 1026. The communications manager 815 may be an example of aspects of the communications manager 1010 described herein.

The CDD request component 822 may receive a request indicating that a peer sidelink node wishes or desires this sidelink node use the CDD antenna diversity scheme in its data transmissions, and process the request along with other information included in the indication. The other information may include, for example, a duration for which the requested antenna diversity scheme is valid.

The CDD determination component 824 may determine whether the sidelink node is to use the CDD antenna diversity scheme in its transmission and if yes, for how long. The determination may be based on a plurality of factors, including the received request, as will be described in more details in the specification related to FIGS. 15-16. The CDD indication component 1026 may generate an indication based on the determination on the use of CDD antenna diversity scheme and broadcast the indication to peer sidelink nodes via a transmitter 1030.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
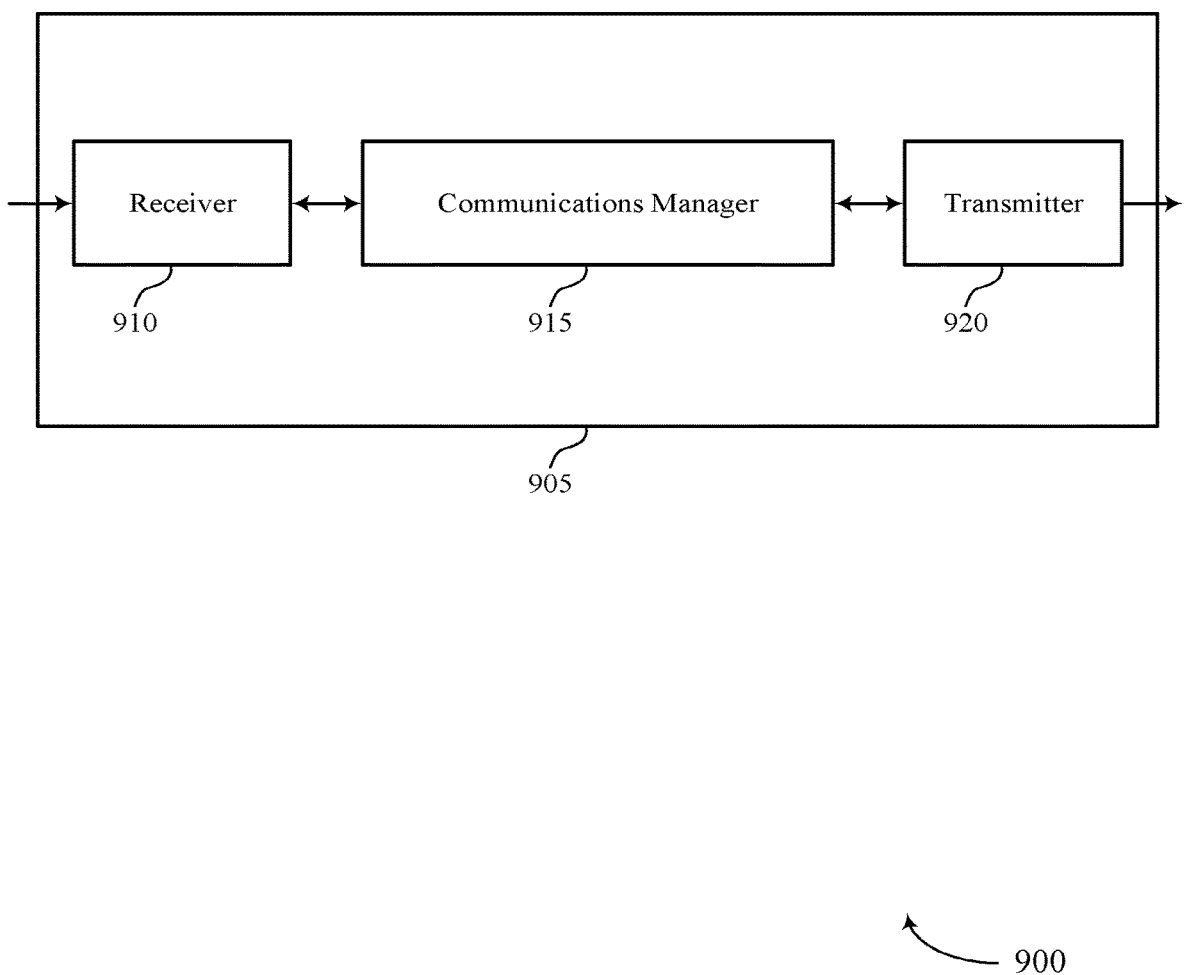
FIGS. 9 and 10 show block diagrams of devices in accordance with aspects of the present disclosure.

FIG. 9 shows a block diagram 900 of a communications manager 905 in accordance with aspects of the present disclosure. The communications manager 905 may be an example of aspects of a communications manager 715, a communications manager 815, or a communications manager 1010 described herein. The communications manager 905 may include a CDD request component 922, a CDD determination component 924, a communication interface 920, a control component 925, a CDD indication component 1126, and a RRC component 930. Each of these modules may communicate, directly or indirectly, with one another (e.g., via one or more buses).

The CDD request component 1122 may receive a request indicating that a peer sidelink node wishes or desires this sidelink node to use the CDD antenna diversity scheme in its data transmission, and process the request along with other information included in the indication. The other information may include, for example, a duration for which the requested antenna diversity scheme is valid The CDD determination component 1124 may determine whether the sidelink node is to use the CDD antenna diversity scheme in its transmission and if yes, for how long. The determination may be based on a plurality of factors, including the received request, as will be described in more details in the specification related to FIGS. 15-16. The CDD indication component 1126 may generate an indication based on the determination on the use of CDD antenna diversity scheme and broadcast the indication to peer sidelink nodes via transmitter 1120.

The communication interface 920 may transmit, to a sidelink node, a data transmission along with a CDD antenna diversity scheme indication. In some examples, the communication interface 920 may transmit, to the sidelink node, a grant scheduling transmission of the data transmission via a sidelink channel.

The control component 925 may transmit the control message including a measurement resource of the sidelink channel. In some examples, the control component 925 may transmit the control message that signal a schedule for transmitting the CDD antenna diversity scheme indication. In some examples, the control component 925 may transmit the control message that indicates to each sidelink node whether it has determined to use the CDD antenna diversity scheme in the current or subsequent data transmissions.

Figure 10:
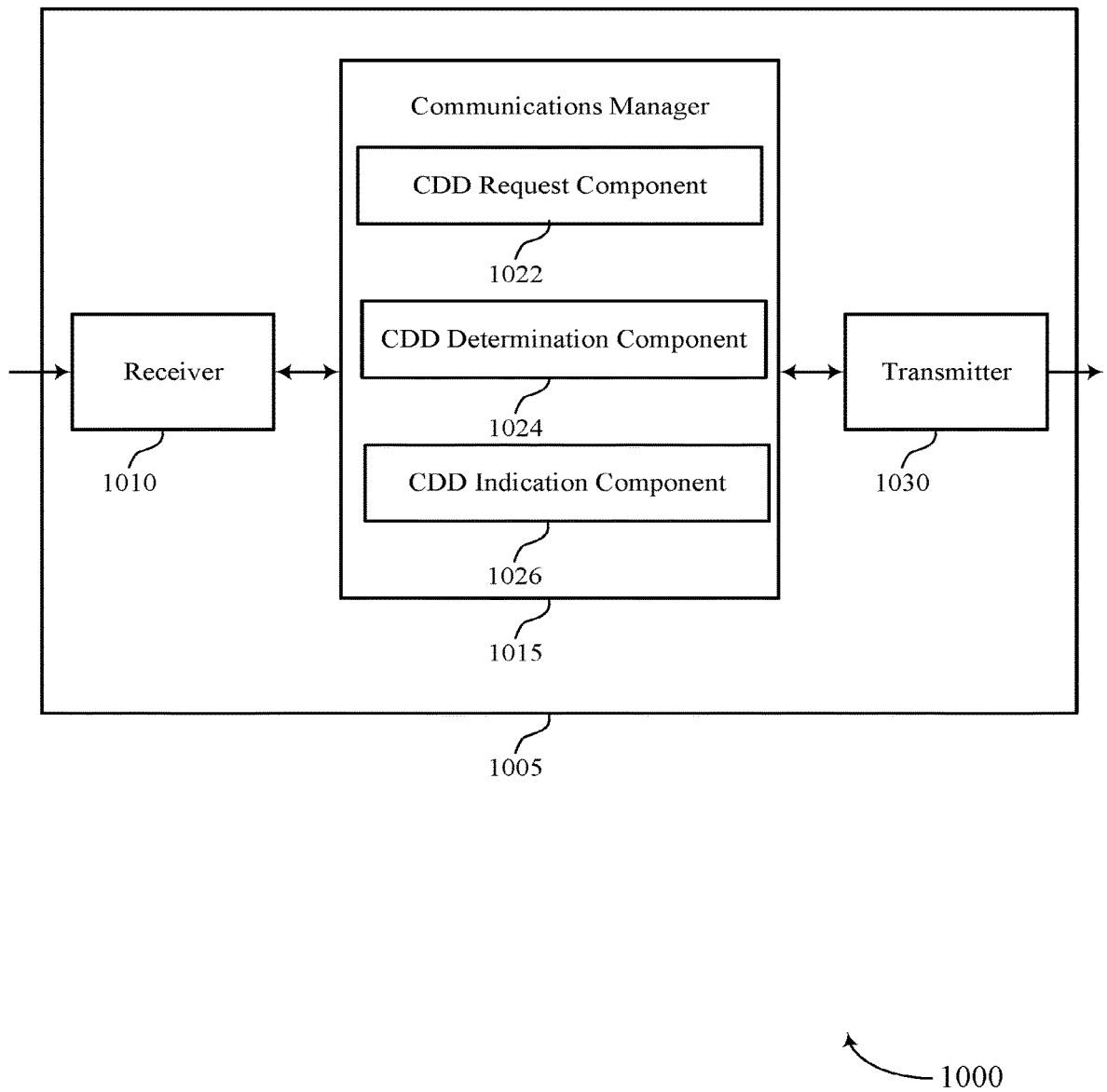

FIG. 10 shows a diagram of a system 1000 including a device 1005 in accordance with aspects of the present disclosure. The device 1005 may be an example of or include the components of device 705, device 805, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

The communications manager 1010 may transmit, to one or more peer sidelink nodes, a control message that indicates whether the CDD antenna diversity scheme is used in the scheduled data transmissions. The communications manager 1010 may also transmit a second control message to the peer sidelink nodes, to request the peer sidelink nodes to use the CDD antenna diversity scheme indication. In an alternative example, the communications manager 1010 may transmit the request in the same sidelink control message as the CDD antenna diversity scheme indication.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting sounding reference signal channel measurement for sidelink communication).

The inter-station communications manager 1045 may manage communications with other sidelink nodes or UEs, and may include a controller or scheduler for controlling communications with UEs 115 in cooperation with other base stations 105. For example, the inter-station communications manager 1045 may coordinate scheduling for transmissions to sidelink nodes or UEs 115 for various interference mitigation techniques such as beamforming or joint transmission.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
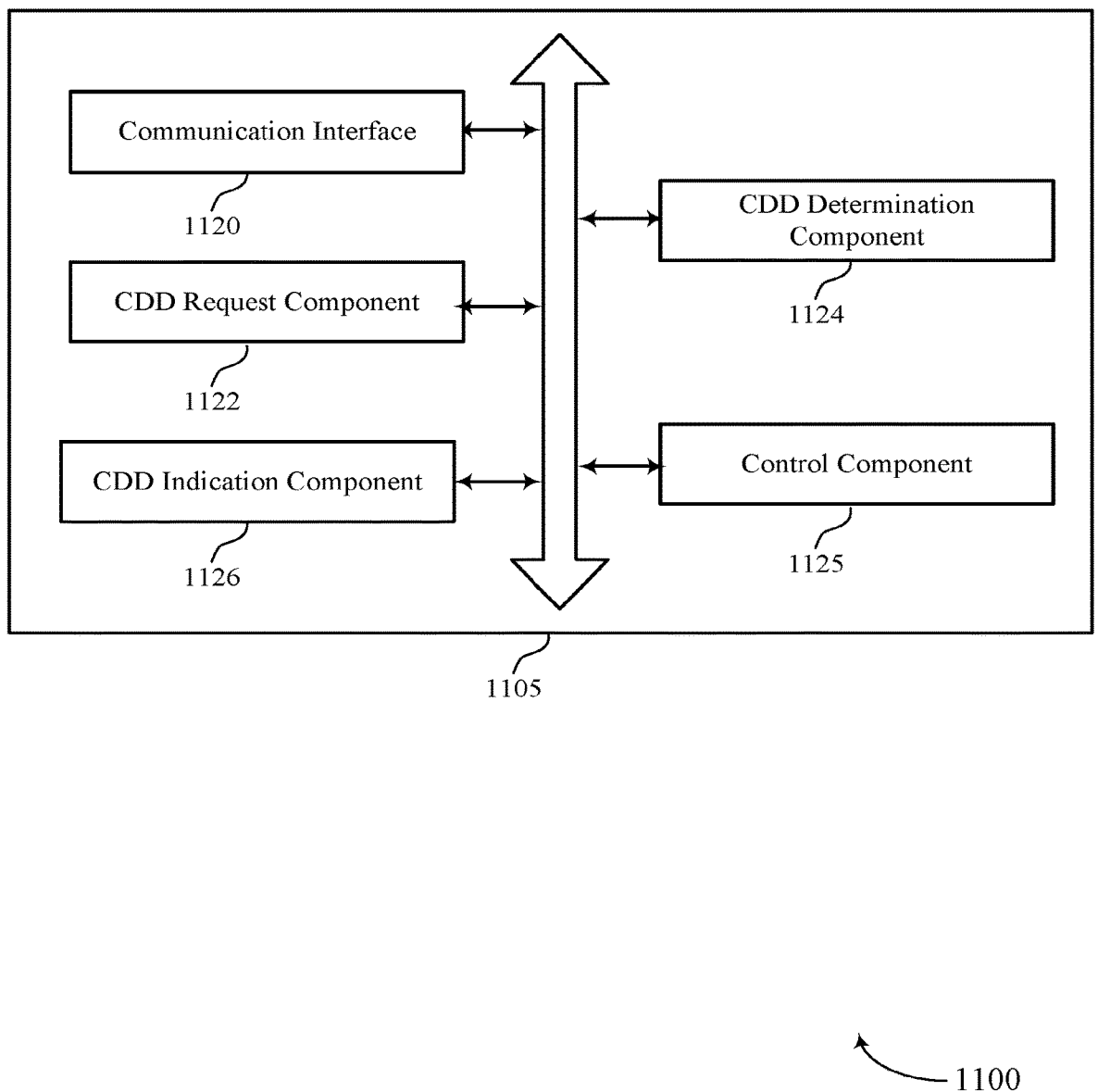
FIG. 11 shows a block diagram of a communications manager in accordance with aspects of the present disclosure.

FIG. 11 shows a flowchart illustrating a method 1100 in accordance with aspects of the present disclosure. The operations of method 1100 may be implemented by a UE 115 of FIG. 1, sidelink nodes 402/404 of FIG. 4 or their components as described herein. For example, the operations of method 1100 may be performed by a communications manager as described with reference to FIGS. 3 through 6. In some examples, a UE or a sidelink node may execute a set of instructions to control the functional elements of the UE or the sidelink to perform the functions described below. Additionally or alternatively, the UE or the sidelink node may perform aspects of the functions described below using special-purpose hardware.

At 1306, the sidelink node receive an indication indicating whether a CDD antenna diversity scheme is used in a data transmission. The operations of 1206 may be performed according to the methods described herein. In some examples, aspects of the operations of 1306 may be performed by a CDD indication component as described with reference to FIGS. 3 through 6.

The indication may be carried in an antenna diversity indication field that is carried in a sidelink control information (SCI) element. In one example aspect, the antenna diversity indication field may include various types of information. For example, it may include a bit field indicating whether the sidelink node uses the CDD antenna diversity scheme and a bit field indicating whether the sidelink node requests that a plurality of peer sidelink nodes use the CDD antenna diversity scheme. A bit field may have a single bit or multiple bits. In another example aspect, the antenna diversity indication field may include a cyclic delay indication.

The SCI may carry a variety of information related to sidelink transmissions. In one example aspect, the SCI is carried in a sidelink control channel and broadcast with the data transmission to all peer sidelink nodes within the transmission range of the sidelink node. In one example aspect, the SCI may include an indication of a duration for which the CDD antenna diversity scheme indicated in the antenna diversity indication field is valid for. If such an indication is absent, a default duration for which the indicated CDD antenna diversity scheme is valid may be used. For example, the default duration may be a subframe. As such, the indicated CDD antenna diversity scheme may be valid for each received subframe, until and unless notified otherwise.

In one example aspect, the SCI may include varieties of information elements. In one example, SCI is carried in a sidelink control channel, such as Physical Sidelink Control Channel, PSCCH. (SCI), which carries the information that the receiving sidelink requires in order to be able to receive and demodulate the PSSCH. As such, the SCI is sent either in advance to or along with a sidelink data transmission.

There may be different formats for SCI to account for different transmission scenarios. For example, there is a SCI format SCI0 defined in 3GPP standards. With SCI0, the receiving UE/sidelink node can identify on the physical layer, whether the data packet is intended for the receiving sidelink node, and deduce the information necessary to demodulate. Additionally, the SCI0 may provide the following additional information: a) Frequency hopping flag: Indicating, whether frequency hopping is applied for the data part; and b) resource block assignment and hopping resource allocation, providing information about the number of allocated resource blocks and their location. If frequency hopping is applied, it provides further information about the hopping configuration. Additionally, the SCI0 may also include a time resource pattern to indicate the subframes used for the data part, a modulation and coding scheme, a timing advance indication for the timing adjustment value for the receiver, and a group destination ID for a receiver selection on the physical layer.

In one example aspect, the indication may indicate a type of CDD antenna diversity scheme. There may be different types of CDD antenna diversity schemes such as dynamic and static CDD antenna diversity scheme. A dynamic CDD antenna diversity scheme may indicate that the CDD antenna diversity scheme may be dynamically applied based on a set of parameters that may be dynamic and changes from time to time. A static CDD antenna diversity scheme may indicate that the CDD antenna diversity scheme is statically applied for a predetermined period of time.

At 1308, the sidelink node such as sidelink node 402 optimizes its operation with regard to the received data transmission based on the received indication. The operations of 1308 may be performed according to the methods described herein. In some examples, aspects of the operations of 1308 may be performed by an operation optimization component as described with reference to FIGS. 3 through 6.

In one example aspect, once the receiving sidelink node or UE has the knowledge of the CDD antenna diversity scheme is used for the received data transmission, the sidelink node may take advantage of the information and adjust its operation parameter such as a time offset, frequency offset or a channel estimation, or some other estimated parameters, for an improved performance. In one example aspect, based on the knowledge that the CDD antenna diversity scheme is used in the received data transmission, the receiver may obtain gain processing gains in filtering or timing related operation parameters. For example, the receiver may relax the time offset or frequency offset for decoding of the received data transmission to avoid unnecessary decoding errors, due to a tight frequency or timing offset.

In one example aspect, a CDD gain may depend (among other things) on the cyclic delay. As it stands now, the cyclic delay between two antennas is bounded by a fixed default value based on the assumption that the receiver has no knowledge of this delay. Once the receiver sidelink knows that CDD was transmitted, the specific limitation may be looser to enable more CDD gain due to more diversity in some scenarios. In such a scenario, overall performance in decoding of received data transmission may be improved.

The method 1300 is for illustration purpose and shows one possible process for a UE or a sidelink node to receive the information about the use of the CDD antenna diversity scheme and to take actions based on the information to improve its performance, as appropriate. In practice, one or more steps shown in the illustrative flowchart for the method 1300 may be combined with other steps, performed in any suitable order, performed in parallel (e.g., simultaneously or substantially simultaneously), or removed.

Figure 12:
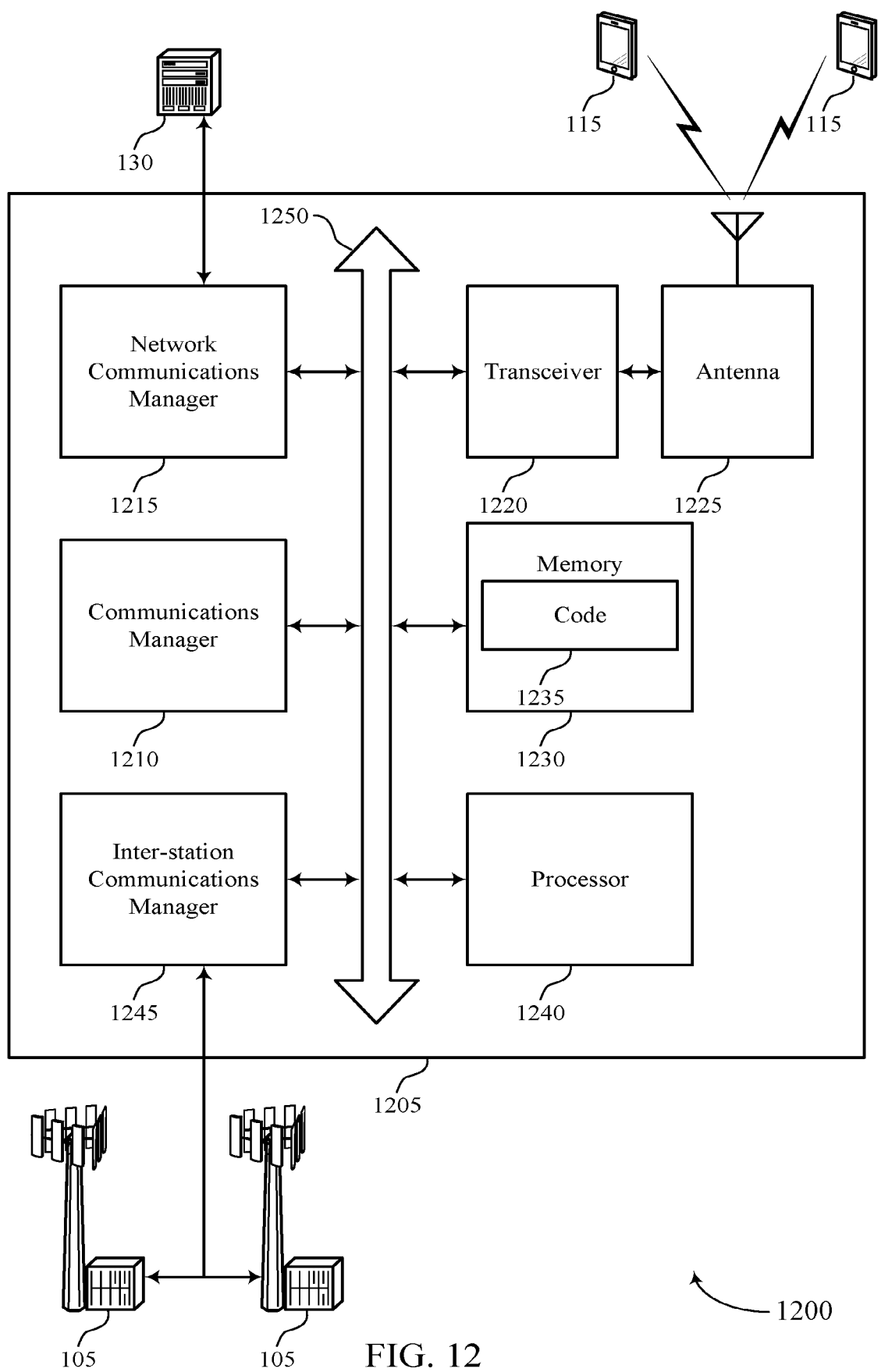
FIG. 12 shows a diagram of a system including a device in accordance with aspects of the present disclosure.

FIG. 12 shows a flowchart illustrating a method 1200 in accordance with aspects of the present disclosure. The operations of method 1200 may be implemented by a UE 115 of FIG. 1 or a sidelink node 402 or 404 of FIG. 4. For example, the operations of method 1200 may be performed by a communications manager as described with reference to FIGS. 3 through 6. In some examples, a sidelink node may execute a set of instructions to control the functional elements of the sidelink node to perform the functions described below. Additionally or alternatively, a sidelink node may perform aspects of the functions described below using special-purpose hardware.

At 1402, the sidelink node receive an indication indicating whether a CDD antenna diversity scheme is used in a data transmission. The operations of 1202 may be performed according to the methods described herein. In some examples, aspects of the operations of 1202 may be performed by an CDD indication component as described with reference to FIGS. 3 through 6.

The indication may be carried in an antenna diversity indication field that is carried in a sidelink control information (SCI) element. In one example aspect, the antenna diversity indication field may include various types of information. For example, it may include a bit field indicating whether the sidelink node uses the CDD antenna diversity scheme and a bit field indicating whether the sidelink node requests that the plurality of peer sidelink nodes use the CDD antenna diversity scheme. A bit field may have a single bit or multiple bits. In another example aspect, the antenna diversity indication field may include a cyclic delay indication.

The SCI may carry a variety of information related to sidelink transmissions. In one example aspect, the SCI is carried in a sidelink control channel and broadcast with the data transmission to all peer sidelink nodes within the transmission range of the sidelink node. In one example aspect, the SCI may include an indication of a duration for which the CDD antenna diversity scheme indicated in the antenna diversity indication field is valid for. If such an indication is absent, a default duration for which the indicated CDD antenna diversity scheme is valid may be used. For example, the default duration may be a subframe. As such, the indicated CDD antenna diversity scheme may be valid for each received subframe, until and unless notified otherwise.

In one example aspect, the SCI may include varieties of information elements. In one example, SCI is carried in a sidelink control channel, such as Physical Sidelink Control Channel, PSCCH. (SCI), which carries the information that the receiving sidelink requires in order to be able to receive and demodulate the PSSCH. As such, the SCI is sent either in advance to or along with a sidelink data transmission.

There may be different formats for SCI to account for different transmission scenarios. For example, there is a SCI format SCI0 defined in 3GPP standards. With SCI0, the receiving UE can identify on the physical layer, whether the data packet is intended for the receiving sidelink node, and deduce the information necessary to demodulate. Additionally, the SCI0 provides the following information: a) Frequency hopping flag: Indicates, whether frequency hopping is applied for the data part; and b) resource block assignment and hopping resource allocation, providing information about the number of allocated resource blocks and their location. If frequency hopping is applied, it provides further information about the hopping configuration. Additionally, the SCI0 may also include a time resource pattern to indicate the subframes used for the data part, a modulation and coding scheme, a timing advance indication for the timing adjustment value for the receiver, and a group destination ID for a receiver selection on the physical layer.

In one example aspect, the indication may indicate a type of CDD antenna diversity scheme. There may be different types of CDD antenna diversity schemes such as dynamic and static CDD antenna diversity scheme. A dynamic CDD antenna diversity scheme may indicate that the CDD antenna diversity scheme may be dynamically applied based on a set of parameters that may be dynamic and changes from time to time. A static CDD antenna diversity scheme may indicate that the CDD antenna diversity scheme is statically applied for a predetermined period of time.

In one example aspect, the example of the sidelink node may be a user equipment, a laptop, an auto-driving vehicle, or a network node with a capability of sidelink communications, as illustrated as various end devices 115 of FIG. 1.

At 1404, the sidelink node such as sidelink node 402 may optimize its operation with regard to the received data transmission based on the received indication. The operations of 1204 may be performed according to the methods described herein. In some examples, aspects of the operations of 1204 may be performed by an operation optimization component as described with reference to FIGS. 3 through 6.

In one example aspect, once the receiving sidelink node or UE has the knowledge of the CDD antenna diversity scheme is used for the received data transmission, the sidelink node may take advantage of the information and adjust its operation parameter such as a time offset, frequency offset or a channel estimation, or some other estimated parameters, for an improved performance. In one example aspect, based on the knowledge that the CDD antenna diversity scheme is used in the received data transmission, the receiver may obtain gain processing gains in filtering or timing related operation parameters. For example, the receiver may relax the time offset or frequency offset for decoding of the received data transmission to avoid unnecessary decoding errors, due to a tight frequency or timing offset.

In one example aspect, a CDD gain may depend (among other things) on the cyclic delay. As it stands now, the cyclic delay between two antennas is bounded by a fixed default value based on the assumption that the receiver has no knowledge of this delay. Once the receiver sidelink knows that CDD was transmitted, the specific limitation may be looser to enable more CDD gain due to more diversity in some scenarios. In such a scenario, overall performance in decoding of received data transmission may be improved.

At 1406, the sidelink node determines whether to request a plurality of peer sidelink nodes to use CDD antenna diversity scheme. The operations of 1406 may be performed according to the method described herein. In some examples, aspects of the operations of 1406 may be performed at least by a CDD request component as described with reference to FIGS. 3 through 6.

At 1406, the sidelink node determine whether to request a plurality of peer sidelink nodes to CDD antenna diversity scheme based on a varieties of factors. In one example aspect, the factors may include sidelink capabilities, UE operation environments, speed of the sidelink node, and sidelink node antenna installation/radiation patterns, etc. In another example aspect, the factors may include the fact of whether or not the majority of peer sidelink nodes are using or support the CDD antenna diversity scheme.

At 1408, the sidelink node may broadcast the request to the plurality of peer sidelink nodes. The operations of 1408 may be performed according to the methods described herein. In some examples, aspects of the operations of 1408 may be performed by a CDD request component as described with reference to FIGS. 3 through 6.

In one example aspect, the sidelink node may broadcast the request in a sidelink control channel, such as a Physical Sidelink Control Channel (PSCCH). PSCCH channel is analogous to the Physical Downlink Control Channel (PDCCH) in that it carries the sidelink control information (SCI) message, which contains information about the resource allocation of the physical sidelink shared channel, among other information elements.

The method 1400 is for illustration purpose and shows one possible process for a sidelink nodes to receive and take actions based on the information that the CDD antenna diversity scheme is used in a data transmission. In practice, one or more steps shown in the illustrative flowchart for the method 1400 may be combined with other steps, performed in any suitable order, performed in parallel (e.g., simultaneously or substantially simultaneously), or removed.

Figure 13:
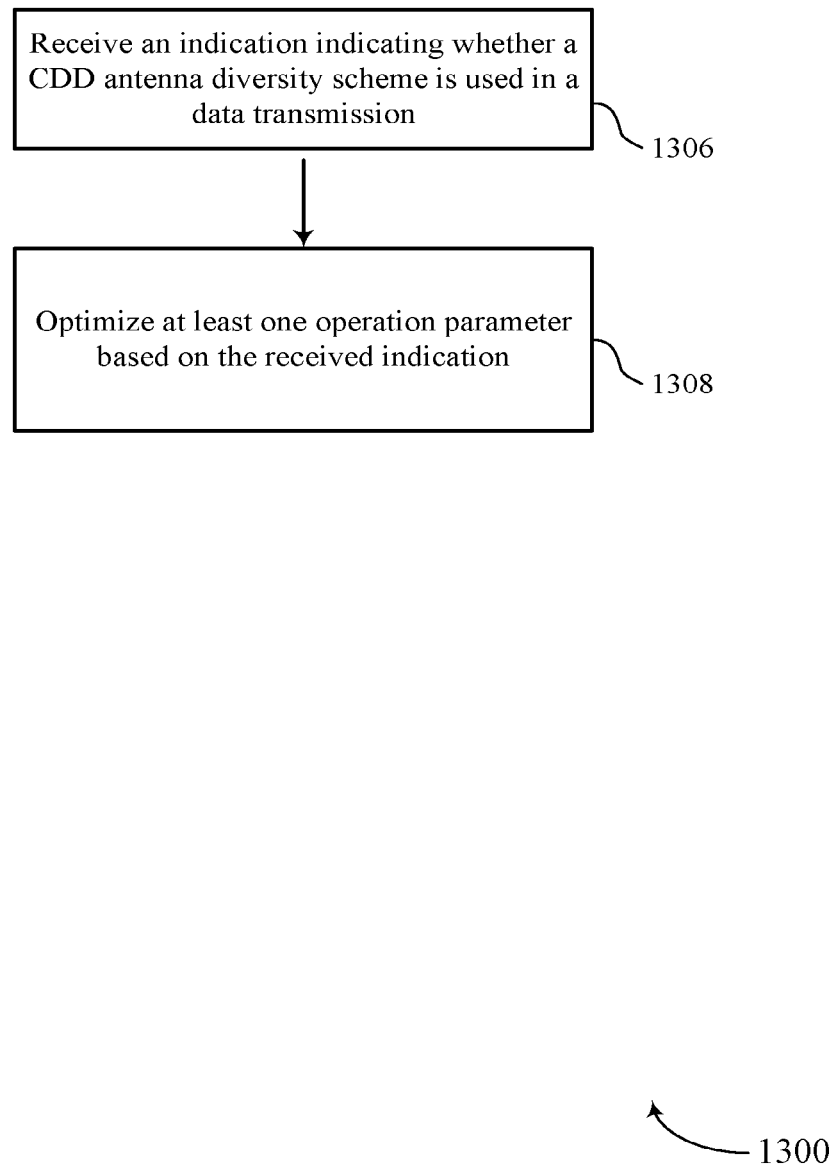
FIGS. 13 through 14 show flowcharts illustrating methods performed by a sidelink, a UE or a like device in accordance with aspects of the present disclosure.

FIG. 13 shows a flowchart illustrating a method 1300 in accordance with aspects of the present disclosure. The operations of method 1300 may be implemented by a peer sidelink node 115 or its components as described herein. For example, the operations of method 1300 may be performed by a communications manager as described with reference to FIGS. 7 through 10. In some examples, a sidelink node may execute a set of instructions to control the functional elements of the sidelink node to perform the functions described below. Additionally or alternatively, a sidelink node may perform aspects of the functions described below using special-purpose hardware.

At 1304, the sidelink node determines whether or not to use a CDD antenna diversity scheme for a data transmission. The operations of 1304 may be performed according to the methods described herein. In some examples, aspects of the operations of 1304 may be performed by a CDD determination component as described with reference to FIGS. 7 through 10.

In one aspect, the decision on whether to use the CDD antenna diversity scheme or a traditional Antenna Switching Diversity (ASD) scheme may depends on a number of factors. In one example, the factors may include whether a majority of the peer sidelink nodes use the CDD antenna diversity scheme. If a majority of peer sidelink nodes are using the CDD antenna diversity scheme, the chance for this sidelink node to use it may be greater because it implies at least majority of peer sidelink nodes have the capability to support the CDD antenna diversity scheme. In another example aspect, the factors to be considered may include a set of transmission parameters such as a modulation and coding scheme (MCS) used for the data transmission, a set of hardware settings including a cables loss, an antenna pattern radiation, an RX antenna imbalance, and an TX antenna imbalance. In another example aspect, the factors to be considered may include a set of estimations of the surrounding environment that may include a doppler spread, and a delay spread. In another example aspect, the factors to be considered may include a medium allocation size.

At 1306, the peer sidelink node transmit an indication indicating whether the CDD antenna diversity scheme is used for the data transmission. The operations of 1306 may be performed according to the methods described herein. In some examples, aspects of the operations of 1306 may be performed by a CDD indication component and a control component as described with reference to FIGS. 7 through 10.

The method 1500 is for illustration purpose and shows one possible process for a sidelink node to determine whether to use the CDD antenna diversity scheme for a data transmission and convey the CDD information to peer sidelink nodes. In practice, one or more steps shown in the illustrative flowchart for the method 1600 may be combined with other steps, performed in any suitable order, performed in parallel (e.g., simultaneously or substantially simultaneously), or removed.

Figure 14:
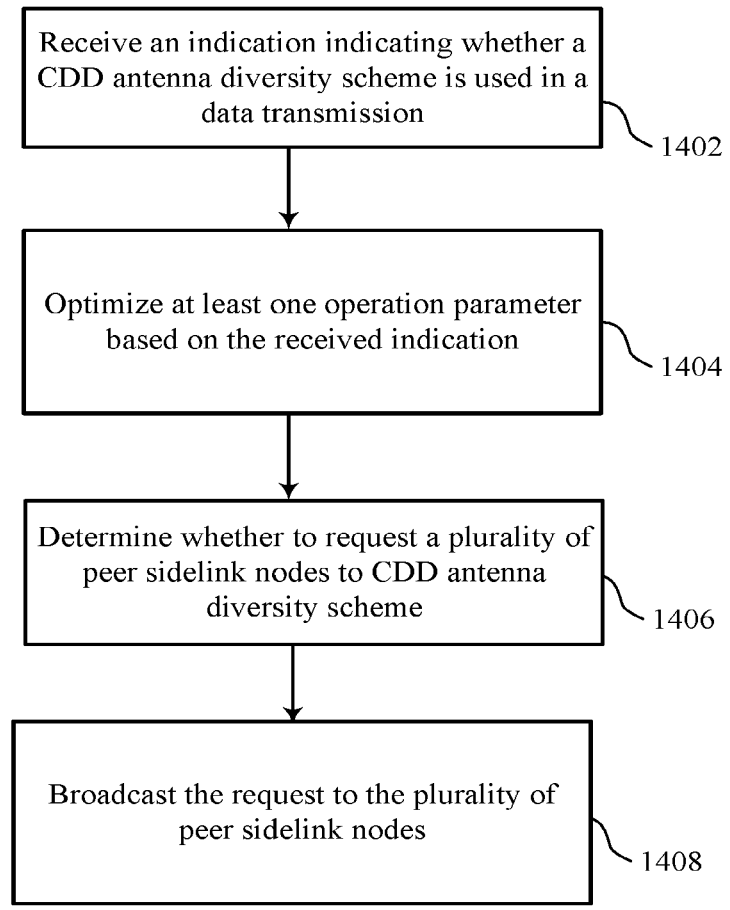

FIG. 14 shows a flowchart illustrating a method 1400 in accordance with aspects of the present disclosure. The operations of method 1400 may be implemented by a peer sidelink node such as some UEs 115 of FIG. 1, sidelink nodes 402 and 404 of FIG. 4, or their components as described herein. For example, the operations of method 1400 may be performed by a communications manager as described with reference to FIGS. 7 through 10. In some examples, a peer sidelink node may execute a set of instructions to control the functional elements of the peer sidelink node to perform the functions described below. Additionally or alternatively, a sidelink node may perform aspects of the functions described below using special-purpose hardware.

At 1602, the peer sidelink node receive a request to use a CDD antenna diversity scheme in a data transmission. The operations of 1602 may be performed according to the methods described herein. In some examples, aspects of the operations of 1602 may be performed by a CDD request component as described with reference to FIGS. 7 through 10.

In one example aspect, the request may be included in a CDD antenna diversity indication field and the CDD antenna diversity indication field may be included in a sidelink control information (SCI) element of a sidelink control message carried on a sidelink control channel. In one example aspect, the sidelink control channel may be a PSCCH, as described above.

In one example aspect, as indicated above, the CDD antenna diversity indication may include a bit field indicating whether the sidelink node requests that the plurality of peer sidelink nodes use the CDD antenna diversity scheme. In addition, the CDD antenna diversity indication field may also include a bit field indicating whether the sidelink node uses the CDD antenna diversity scheme for a data transmission and a field indicating a cyclic delay indication.

At 1604, the sidelink node determine whether or not to use a CDD antenna diversity scheme in a data transmission. The operations of 1604 may be performed according to the methods described herein. In some examples, aspects of the operations of 1306 may be performed by a CDD determination component and a control component as described with reference to FIGS. 7 through 10.

In one aspect, the decision on whether to use the CDD antenna diversity scheme or a traditional Antenna Switching Diversity (ASD) scheme may depends on a number of factors. In one example, the factors may include whether a majority of the peer sidelink nodes request that the CDD antenna diversity scheme be used. If majority of peer sidelink nodes are using the CDD antenna diversity scheme, the chance for this peer sidelink node to use the same antenna diversity scheme may be greater because it implies at least majority of peer sidelink nodes have the capability to support the CDD antenna diversity scheme. In another example aspect, the factors may include a set of transmission parameters such as a modulation and coding scheme (MCS) used for the data transmission and a resource allocation, and a set of hardware settings including a cables loss, an antenna pattern radiation, an RX antenna imbalance, and an TX antenna imbalance. In another example aspect, the factors to be considered may include a set of estimations of the surrounding environment that may include a doppler spread, and a delay spread. In another example aspect, the factors to be considered may include a resource allocation size.

In one example aspect, the sidelink node may also determine to use a static CDD antenna diversity scheme or a dynamic CDD antenna diversity scheme, when the sidelink node determines to use the CDD antenna diversity scheme. In one example aspect, the indication may indicate a type of CDD antenna diversity scheme. There may be different types of CDD antenna diversity schemes such as dynamic and static CDD antenna diversity scheme. A dynamic CDD antenna diversity scheme may indicate that the CDD antenna diversity scheme may be dynamically applied based on a set of parameters that may be dynamic and changes from time to time. A static CDD antenna diversity scheme may indicate that the CDD antenna diversity scheme is statically applied for a predetermined period of time.

The request received from a peer sidelink node requesting this sidelink node to use the CDD antenna diversity scheme may also be one of the factors to be considered. For example, a received request may help the receiving sidelink node determine if the majority of the peer sidelink nodes are using the CDD antenna diversity scheme. However, the request may be one of multiple factors, as described above, to be considered by the sidelink node in determining whether or not to use the CDD antenna diversity scheme.

At 1606, the peer sidelink node transmits an indication indicating whether the CDD antenna diversity scheme is used for the data transmission. The operations of 1306 may be performed according to the methods described herein. In some examples, aspects of the operations of 1606 may be performed by a CDD indication component and a communication interface component as described with reference to FIGS. 7 through 10.

At 1608, the peer sidelink node performs a data transmission using CDD antenna diversity scheme. The operations of 1408 may be performed according to the methods described herein. In some examples, aspects of the operations of 1408 may be performed by a communication interface as described with reference to FIGS. 7 through 10.

The method 1600 is for illustration purpose and shows one possible process for a sidelink nodes to convey, receive and take an action based on the information that the CDD antenna diversity scheme is used in a data transmission. In practice, one or more steps shown in the illustrative flowchart for the method 1600 may be combined with other steps, performed in any suitable order, performed in parallel (e.g., simultaneously or substantially simultaneously), or removed.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a Cellular-Vehicle to Anything (CV2X) environment at a sidelink node for communications, comprising:
    receiving an indication from one of a plurality of peer sidelink nodes indicating whether a cyclic delay diversity (CDD) antenna diversity scheme is used for a data transmission, the indication carried in an antenna diversity indication field of first sidelink control information (SCI);
    optimizing at least one operation parameter based on the received indication that the CDD antenna diversity scheme is used for the data transmission received from the peer sidelink node; and
    determining whether to request the plurality of peer sidelink nodes to use CDD antenna diversity scheme based on at least one operation condition.

2. The method of claim 1, further comprising:
    broadcasting a request to the plurality of peer sidelink nodes in second SCI to use the CDD antenna diversity scheme upon determining to request that the plurality of peer sidelink nodes use the CDD antenna diversity scheme.

3. The method of claim 1, wherein the antenna diversity indication field comprise at least one of:
    a bit field indicating whether the sidelink node uses the CDD antenna diversity scheme;
    a bit field indicating whether the sidelink node desires that the plurality of peer sidelink nodes use the CDD antenna diversity scheme; or
    a field indicating a cyclic delay.

4. The method of claim 1, wherein the at least one operation condition comprises:
    whether a majority of the peer sidelink nodes uses the CDD antenna diversity scheme;
    a set of transmission parameters comprising at least one of a modulation and coding scheme (MCS) or a resource allocation;
    a set of hardware settings comprising a cables loss, an antenna pattern radiation, an RX antenna imbalance, and an TX antenna imbalance; and a set of estimations of environment parameters including a doppler spread and a delay spread.

5. The method of claim 1, wherein optimizing the at least one operation parameter comprises adjusting at least one of: a time offset, a frequency offset or a channel estimation.

6. The method of claim 1, wherein the CDD antenna diversity scheme comprises one of a static CDD antenna diversity scheme or a dynamic CDD antenna diversity scheme.

7. The method of claim 1, wherein the sidelink node or each of the plurality of peer sidelink nodes comprise a user equipment, a laptop, an auto-driving vehicle, or a network device with a capability of sidelink communications.

8. The method of claim 2, wherein each of the first SCI and the second SCI is carried in a sidelink control channel and broadcast with the data transmission.

9. The method of claim 1, wherein the first SCI comprises an indication of a duration for which the CDD antenna diversity scheme indicated in the antenna diversity indication field is valid for.

10. A sidelink node for wireless communication, comprising:
a transceiver;
a memory; and
at least one processor coupled to the memory and configured to
receive an indication from one of a plurality of peer sidelink nodes indicating whether a cyclic delay diversity (CDD) antenna diversity scheme is used for a data transmission, the indication carried in an antenna diversity indication field of first sidelink control information (SCI);
optimize at least one operation parameter based on the received indication that the CDD antenna diversity scheme is used for the data transmission received from the peer sidelink node; and
determine whether to request the plurality of peer sidelink nodes to use CDD antenna diversity scheme based on at least one operation condition.

11. The sidelink node of claim 10, wherein the at least one processor is further configured to:
broadcast a request to the plurality of peer sidelink nodes in second SCI to use the CDD antenna diversity scheme upon determining to request that the plurality of peer sidelink nodes use the CDD antenna diversity scheme.

12. The sidelink node of claim 10, wherein the antenna diversity indication field comprises at least one of:
a bit field indicating whether the sidelink node uses the CDD antenna diversity scheme;
a bit field indicating whether the sidelink node desires that the plurality of peer sidelink nodes use the CDD antenna diversity scheme; or
a field indicating a cyclic delay.

13. The sidelink node of claim 10, wherein the at least one operation condition comprises:
whether a majority of the peer sidelink nodes uses the CDD antenna diversity scheme;
a set of transmission parameters comprising at least one of a modulation and coding scheme (MCS) or a resource allocation;
a set of hardware settings comprising a cables loss, an antenna pattern radiation, an RX antenna imbalance, and an TX antenna imbalance; and
a set of estimations of environment parameters including a doppler spread and a delay spread.

14. The sidelink node of claim 10, wherein to optimize the at least one operation parameter comprises adjusting at least one of: a time offset, a frequency offset or a channel estimation.

15. The sidelink node of claim 10, wherein the CDD antenna diversity scheme comprises one of a static CDD antenna diversity scheme or a dynamic CDD antenna diversity scheme.

16. The sidelink node of claim 10, wherein the sidelink node or each of the plurality of peer sidelink nodes comprise a user equipment, a laptop, an auto-driving vehicle, or a network device with a capability of sidelink communications.

17. The sidelink node of claim 11, wherein each of the first SCI and the second SCI is carried in a sidelink control channel and broadcast with the data transmission.

18. The sidelink node of claim 10, wherein the first SCI comprises an indication of a duration for which the CDD antenna diversity scheme indicated in the antenna diversity indication field is valid for.

19. A method for wireless communication in a cellular-vehicle to anything (CV2X) environment at a sidelink node for communications, comprising, comprising:
determining whether to use a cyclic delay diversity (CDD) antenna diversity scheme based on at least one operation parameter;
transmitting an indication in a first sidelink control information (SCI) in a broadcast sidelink control message indicating to a plurality of peer sidelink nodes whether to use the CDD antenna diversity scheme for a data transmission, the indication carried in an antenna diversity indication field of the first SCI; and
receiving a request in an antenna diversity indication field of a second sidelink control information (SCI) from each of the plurality of peer sidelink nodes, the request requesting that the sidelink node use the CDD antenna diversity scheme.

20. The method of claim 19, further comprising
performing the data transmission using the CDD antenna diversity scheme upon determining to use the CDD antenna diversity scheme.

21. The method of claim 19, wherein the determining comprises taking into account at least one of:
whether a majority of the peer sidelink nodes use the CDD antenna diversity scheme, based on the received request from each of the plurality of peer sidelink nodes;
a set of transmission parameters comprising at least one of an MCS or a resource allocation;
a set of hardware settings comprising at least one of: a cables loss, an antenna pattern radiation and antenna imbalance; or
a set of environment parameters comprising at least one of a doppler spread, and a delay spread.

22. The method of claim 19, wherein the antenna diversity indication field comprise at least one of:
a bit field indicating whether the sidelink node uses the CDD antenna diversity scheme;
a bit field indicating whether the sidelink node desires that the plurality of peer sidelink nodes use the CDD antenna diversity scheme; or
a field indicating a cyclic delay.

23. The method of claim 19, wherein the sidelink node and the plurality of peer sidelink nodes comprise a user equipment, a laptop, an auto-driving vehicle, a network device of a capability of sidelink communications.

24. The method of claim 19, wherein each of the first SCI and the second SCI is carried in a sidelink control channel and broadcast with or in advance of a data transmission.

25. The method of claim 19, wherein each of the first SCI and the second SCI comprises an indication of a duration for which the CDD antenna diversity scheme indicated in the antenna diversity indication field is valid.

26. A sidelink node for wireless communication, comprising:
- a transceiver;
- a memory; and
- at least one processor coupled to the memory and configured to
- determine whether to use a cyclic delay diversity (CDD) antenna diversity scheme based on at least one operation parameter; and
- transmit an indication in a first sidelink control information (SCI) in a broadcast sidelink control message indicating to a plurality of peer sidelink nodes whether to use the CDD antenna diversity scheme for a data transmission, the indication carried in an antenna diversity indication field of the first SCI; and
- receiving a request in an antenna diversity indication field of a second sidelink control information (SCI) from each of the plurality of peer sidelink nodes, the request requesting that the sidelink node use the CDD antenna diversity scheme.

27. The sidelink node of claim 26, wherein the at least one processor is further configured to perform:
- data transmission using the CDD antenna diversity scheme upon determining to use the CDD antenna diversity scheme.

* * * * *